(12) United States Patent
Hugel et al.

(10) Patent No.: US 10,395,409 B2
(45) Date of Patent: Aug. 27, 2019

(54) METHOD AND SYSTEM FOR REAL-TIME VIRTUAL 3D RECONSTRUCTION OF A LIVE SCENE, AND COMPUTER-READABLE MEDIA

(71) Applicant: VIRTUALLY LIVE (SWITZERLAND) GMBH, Zurich (CH)

(72) Inventors: Karl-Heinz Hugel, Berlin (DE); Florian Struck, Hamburg (DE)

(73) Assignee: Virtually Live (Switzerland)GMBH, Zurich (CH)

( * ) Notice: Subject to any disclaimer, the term of this patent is extended or adjusted under 35 U.S.C. 154(b) by 0 days.

(21) Appl. No.: 16/160,985

(22) Filed: Oct. 15, 2018

(65) Prior Publication Data

US 2019/0122407 A1 Apr. 25, 2019

Related U.S. Application Data

(63) Continuation of application No. 15/875,826, filed on Jan. 19, 2018, now Pat. No. 10,102,660, which is a (Continued)

(30) Foreign Application Priority Data

Jul. 4, 2012 (EP) ..................................... 12174999

(51) Int. Cl.
G06T 13/20 (2011.01)
A63F 13/25 (2014.01)
G09G 5/22 (2006.01)

(52) U.S. Cl.
CPC .............. *G06T 13/20* (2013.01); *A63F 13/25* (2014.09); *G09G 5/227* (2013.01);
(Continued)

(58) Field of Classification Search
None
See application file for complete search history.

(56) References Cited

U.S. PATENT DOCUMENTS

2003/0037156 A1 2/2003 Mallart
2009/0262137 A1 10/2009 Walker
(Continued)

FOREIGN PATENT DOCUMENTS

EP 1 796 047 A1 6/2007

OTHER PUBLICATIONS

Bennewitz, Maren, Wolfram Burgard, and Sebastian Thrun, "Adapting navigation strategies using motions patterns of people," Robotics and Automation, 2003, Proceedings. ICRA'03. IEEE International Conference on. vol. 2. IEEE, 2003.
(Continued)

*Primary Examiner* — Zhengxi Liu
(74) *Attorney, Agent, or Firm* — Martin & Ferraro, LLP

(57) ABSTRACT

A method, system and computer-program product for real-time virtual 3D reconstruction of a live scene in an animation system. The method comprises receiving 3D positional tracking data for a detected live scene by the processor, determining an event by analyzing the 3D positional tracking data by the processor, comprising steps of determining event characteristics from the 3D positional tracking data, receiving pre-defined event characteristics, determining an event probability by comparing the event characteristics to the pre-defined event characteristics, and selecting an event assigned to the event probability, determining a 3D animation data set from a plurality of 3D animation data sets assigned to the selected event and stored in the data base by the processor, and providing the 3D animation data set to the output device.

20 Claims, 15 Drawing Sheets

Figure 1:
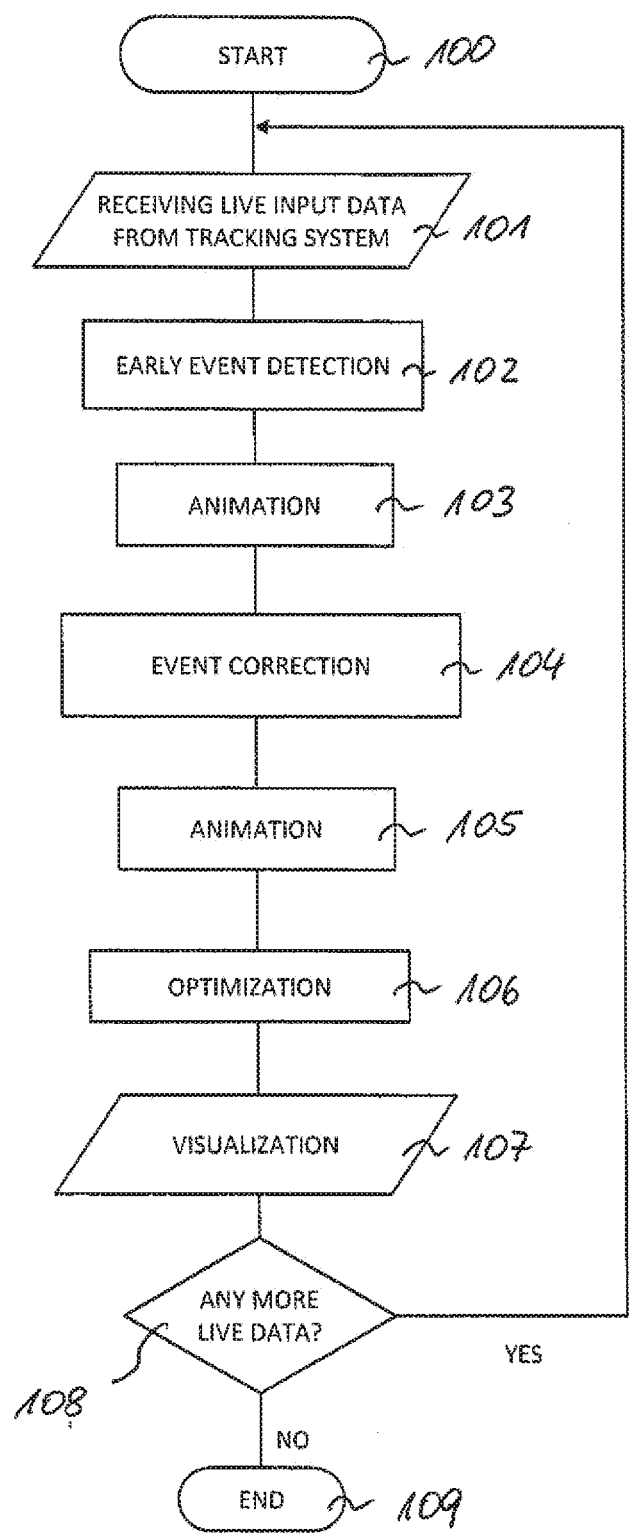

Related U.S. Application Data continuation of application No. 14/410,943, filed as application No. PCT/EP2013/064152 on Jul. 4, 2013, now Pat. No. 9,886,788.

(52) U.S. Cl.
CPC ....... *A63F 2300/64* (2013.01); *A63F 2300/66* (2013.01); *G06T 2213/12* (2013.01)

(56) References Cited

U.S. PATENT DOCUMENTS

| | | |
|---|---|---|
| 2010/0009747 A1 | 1/2010 | Reville et al. |
| 2010/0034462 A1 | 2/2010 | Nevatia et al. |
| 2013/0184079 A1 | 7/2013 | Costello et al. |

OTHER PUBLICATIONS

Choi, Min Gyu, Jehee Lee, and Sung Yong Shin. "Planning biped locomotion using motion capture data and probabilistic roadmaps." ACM Transactions on Graphics (TOG) 22.2 (2003): 182-203.

Dawei Liang et al., Video2Cartoon: A System for Converting Broadcast Soccer Video into 3D Cartoon Animation, IEEE Transactions on Consumer Electronics, IEEE Service Center, vol. 53, No. 3, pp. 1138-1146, Aug. 1, 2007.

Johansen, Rune Skovbo, "Automated Semi-Procedural Animation for Character Locomotion", (published as Master Thesis at Department of Information and Media Studies at Aarhus University), May 25, 2009.

Kilner, J. et al., 3D action matching with key-pose detection, 2009 IEEE 12th International Conference on Computer Vision Workshops, ICCV Workshops: Kyoto, Japan, Sep. 27-Oct. 4, 2009, Institute of Electrical and Electronics EnQineers, pp. 1-8, Sep. 27, 2009.

Kitagawa et al,, "MoCap for Artists: Workflow and Techniques for Motion Capture", published by Butterworth Heinemann (ISBN: 978-0240810003), May 9, 2008.

Menache, Alberto, "Understanding Motion Capture for Computer Animation", (2nd Edition) published by Morgan Kaufmann (ISBN: 978-0123814968), Nov. 19, 2010.

Park et al., "On-line Locomotion Generation Based on Motion Blending", published by ACM in SCA, 02 Proceedings of the 2002 ACM SIGGRAPH/Eurographics symposium on Computer animation (p. 105-111, 2002, ISBN: 1-58113-573-4,).

A: POSITION OF HIP IN FIRST FRAME OF THE ANIMATION

B: POSITION IN MIDDLE FRAME

C: POSITION IN LAST FRAME

LEGEND:

☐ ACTION RADIUS

⸬ EXTENDED RADIUS

↑ ORIENTATION OF PLAYER

METHOD AND SYSTEM FOR REAL-TIME VIRTUAL 3D RECONSTRUCTION OF A LIVE SCENE, AND COMPUTER-READABLE MEDIA

CROSS-REFERENCE TO RELATED PATENT APPLICATIONS

This application is a continuation of U.S. patent application Ser. No. 15/875,826, filed Jan. 19, 2018 (published as U.S. Patent Publication No. 2018-0211432), which is pending; which is a continuation of U.S. patent application Ser. No. 14/410,943, filed Dec. 23, 2014 (now U.S. Pat. No. 9,886,788); which is a U.S. National Phase Application under 35 U.S.C. § 371 of International Patent Application No. PCT/EP2013/064152 (published as WO2014/006143), filed. Jul. 4, 2013; which claims the benefit of priority under 35 U.S.C. Sec. 119 of European Application No. 12174999.8 filed Jul. 4, 2012; all of which are incorporated by reference in their entireties.

The invention relates to a method and a system for real-time virtual. 3D reconstruction of a live scene.

BACKGROUND

Conventional live broadcasts are more or less static, having only weak ways for interaction with the consumer. The broadcasted live video footage cannot be influenced by the consumer. Users are interested in having individual access to live imagery. Therefore, the live scenes are cloned or to be better said reconstructed in a virtual environment. As a result the consumer can have individual interactive access to virtual live scenes.

In general the approach is applicable to numerous areas. Beginning with industrial workflows or in sports broadcasts to interact with the virtual visualization of a live reconstruction of real motions from characters and objects. As example, reference is often made to a broadcasted football match.

Document EP 1 796 047 A1 refers to a procedure for some simple animation. It's not sufficient and designed for the requirements of a live environment and not for an automatic reconstruction of realistic character animations.

SUMMARY

It is an object to provide an improved technology for real-time virtual 3D reconstruction of a live scene.

A method for real-time virtual 3D reconstruction of a live scene in an animation system is provided. The animation system is having a processor, a data base, an input device, and an output device. In the method, 3D positional tracking data for a detected live scene are received by the processor. Different systems and methods for detecting 3D positional data are available. In a simple case, one positional coordinate is provided for objects of the live scene observed by the positional data tracking system. In the method proposed, the 3D positional tracking data are analyzed by the processor for determining an event. Such step may also be referred to as event detection. In the processor, the event detection comprises determining event characteristics from the 3D positional tracking data, receiving pre-defined event characteristics, and determining an event probability by comparing the event characteristics to the pre-defined event characteristics. Following, an event assigned to the event probability is selected. A 3D animation data set is determined from a plurality of 3D animation data sets assigned to the selected event and stored in the data base by the processor. The event detection using event probability as a decision criterion may also be referred to as early event detection compared to normal event detection. The 3D animation data set is provided to the output device connected to the processor. Through the output device the 3D animation data set may be provided to a display device by wired and/or wireless data communication.

The processor may be implemented in a server device connectable to one or more display devices.

The method proposed allows a real-time presentation of the 3D animation data on a display device, namely a time parallel fashion with respect to the detection of the 3D positional tracking data by the tracking system used.

The event detection may be done by only analyzing positional track data.

An animation data queue may generated by several times repeating one or more of the steps of receiving 3D positional tracking data, determining an event, determining a 3D animation data set, and providing the 3D animation data set.

An event correction may be performed for the animation data queue by at least one of deleting one of the 3D animation data sets from the animation data queue and modifying one of the 3D animation data sets from the animation data queue.

The step of adjusting one of the 3D animation data sets may comprise substituting a 3D animation data set selected from the animation data queue by a new 3D animation data set determined to closer animate the selected event.

The 3D animation data set may be provided as a plurality of 3D sub-data sets being provided with 3D animation data of different data formats, the different data formats being adjusted for different display devices. In case of having the animation data queue generated, different queues may be provided, each queue comprising 3D animation data of different data formats.

The plurality of 3D animation data sets stored in the data base may comprise simulated 3D animation data and/or pre-recorded motion capture data. The simulated 3D animation data may represent an object based on a physical model.

DESCRIPTION OF FURTHER EMBODIMENTS

Figure 2:
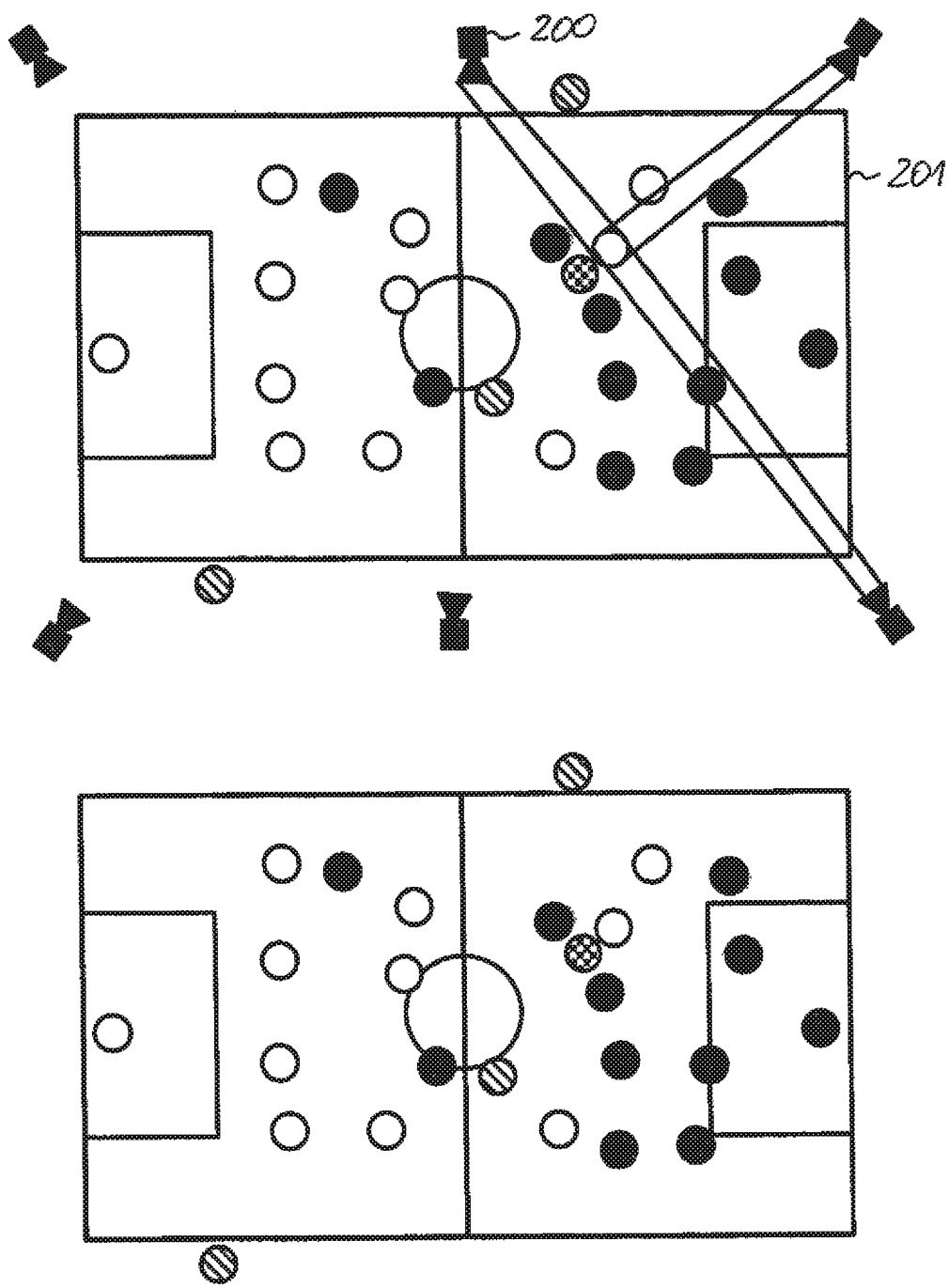
Figure 3:
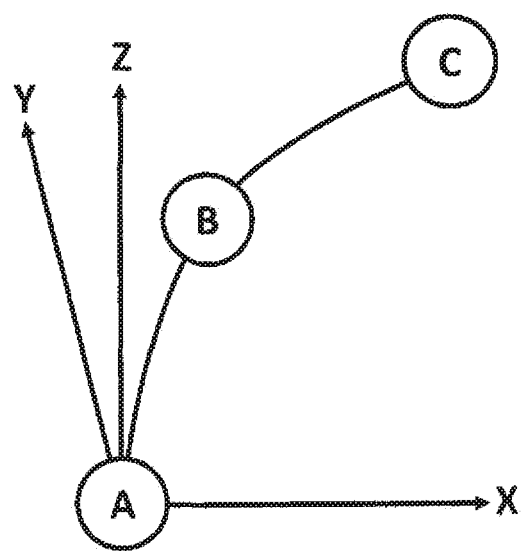
Figure 4:
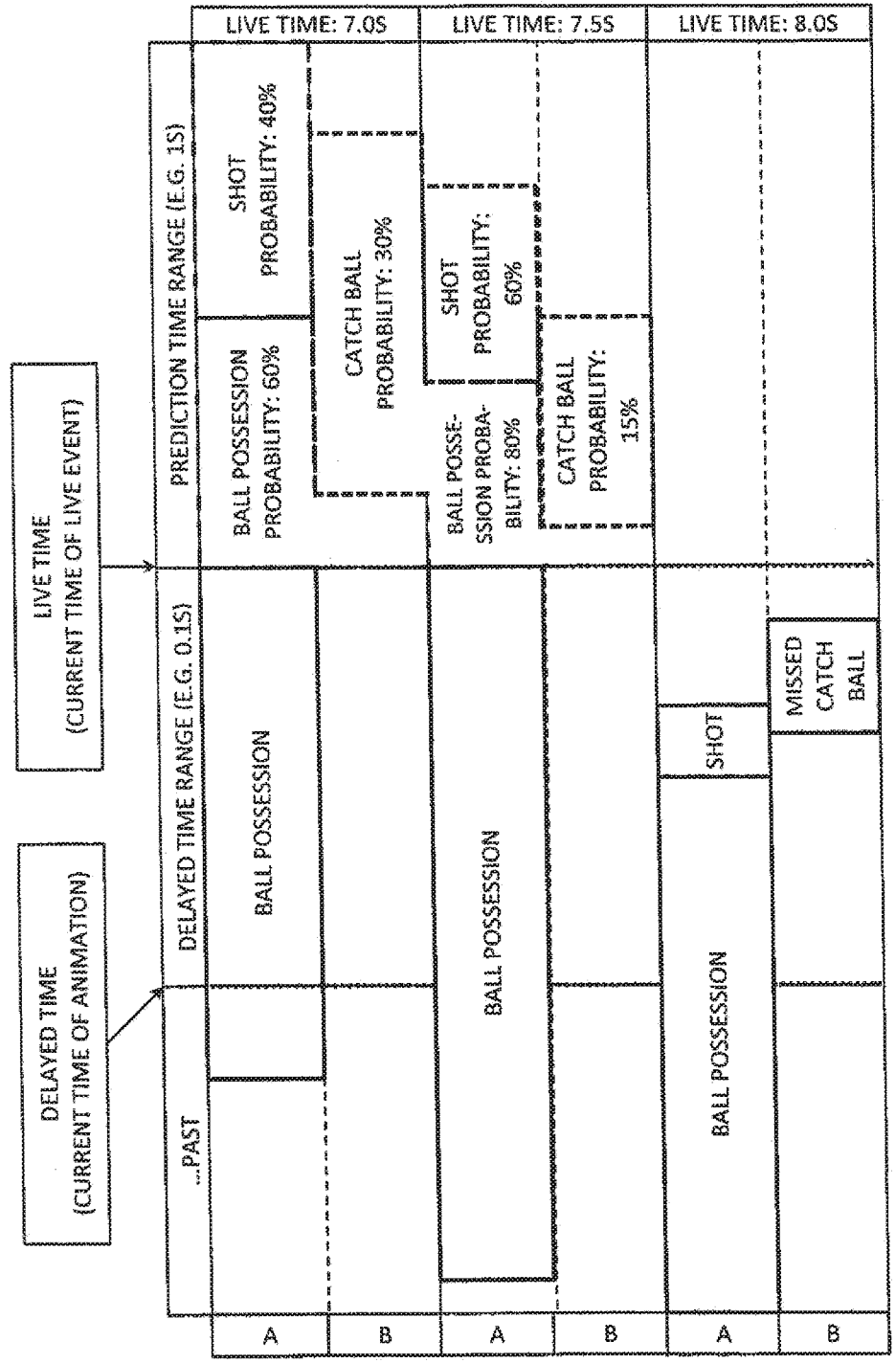
Figure 5:
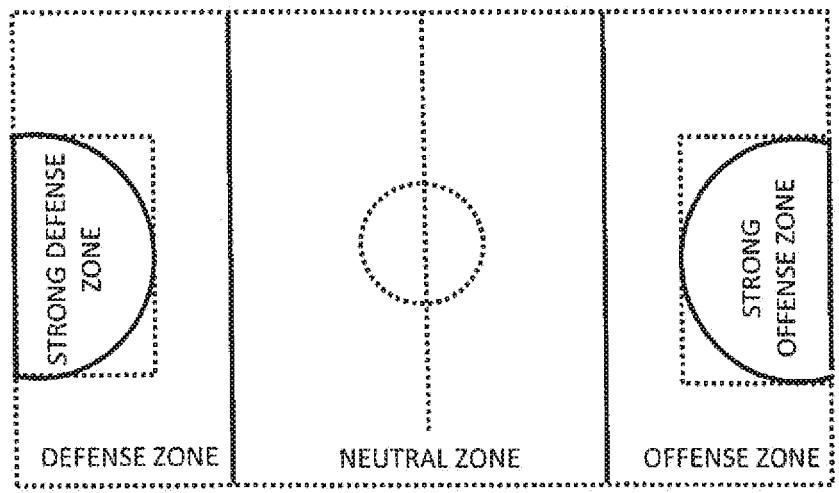
Figure 6:
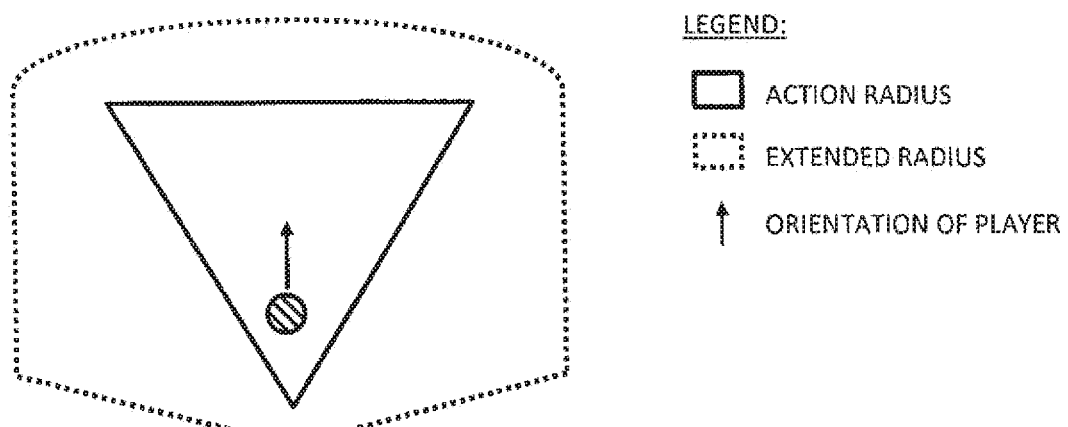
Figure 7:
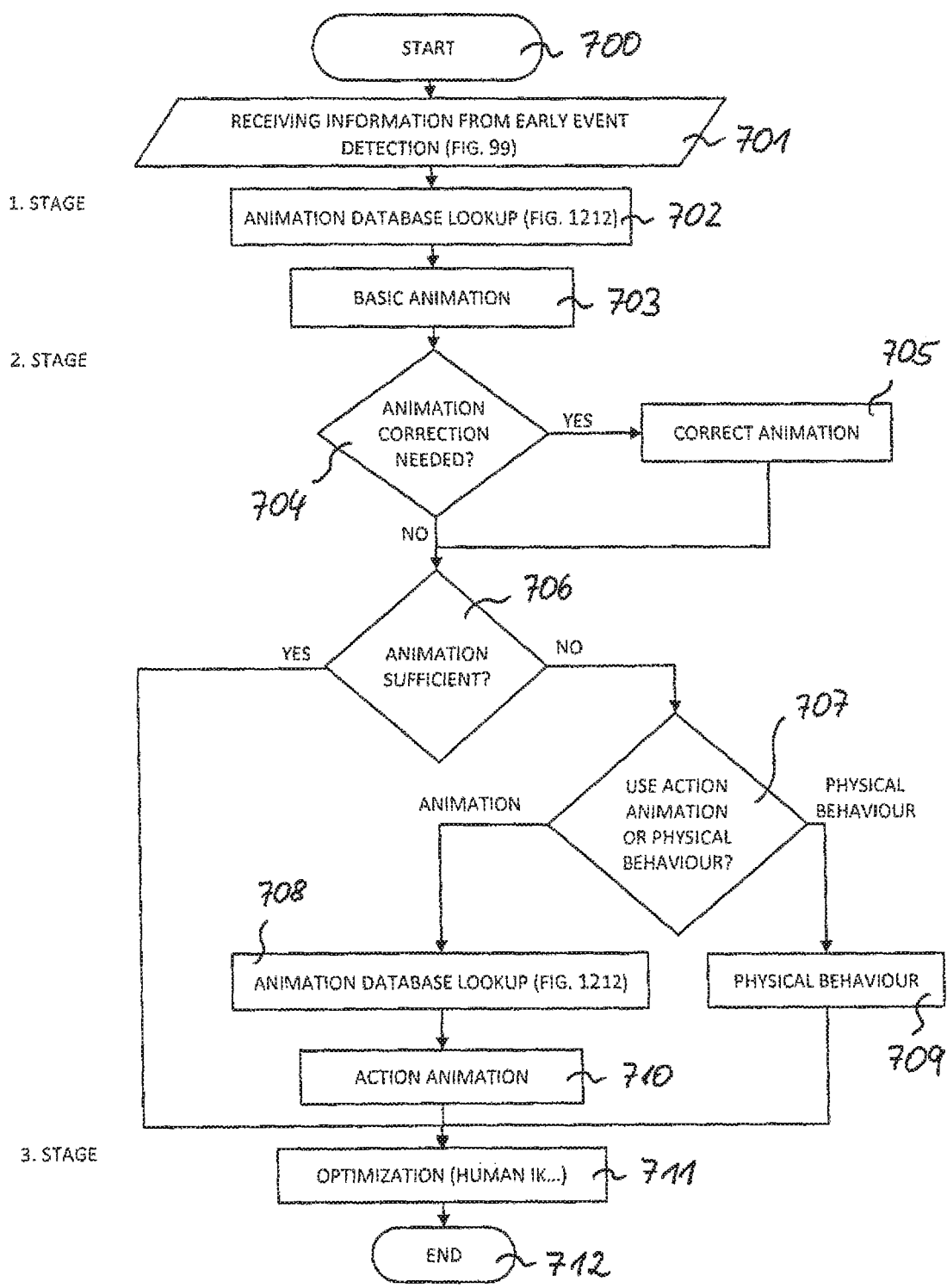
Figure 8:
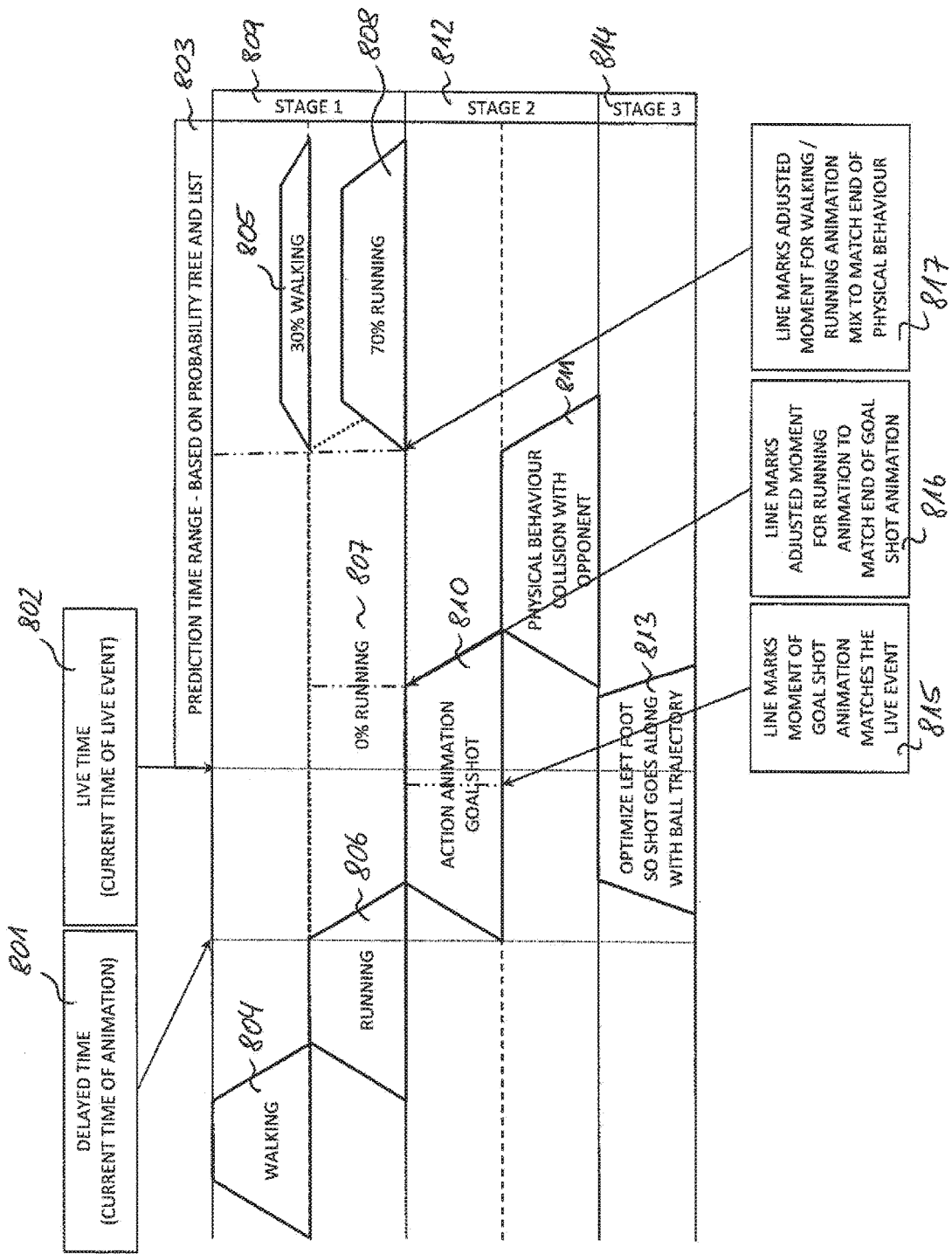
Figure 9:
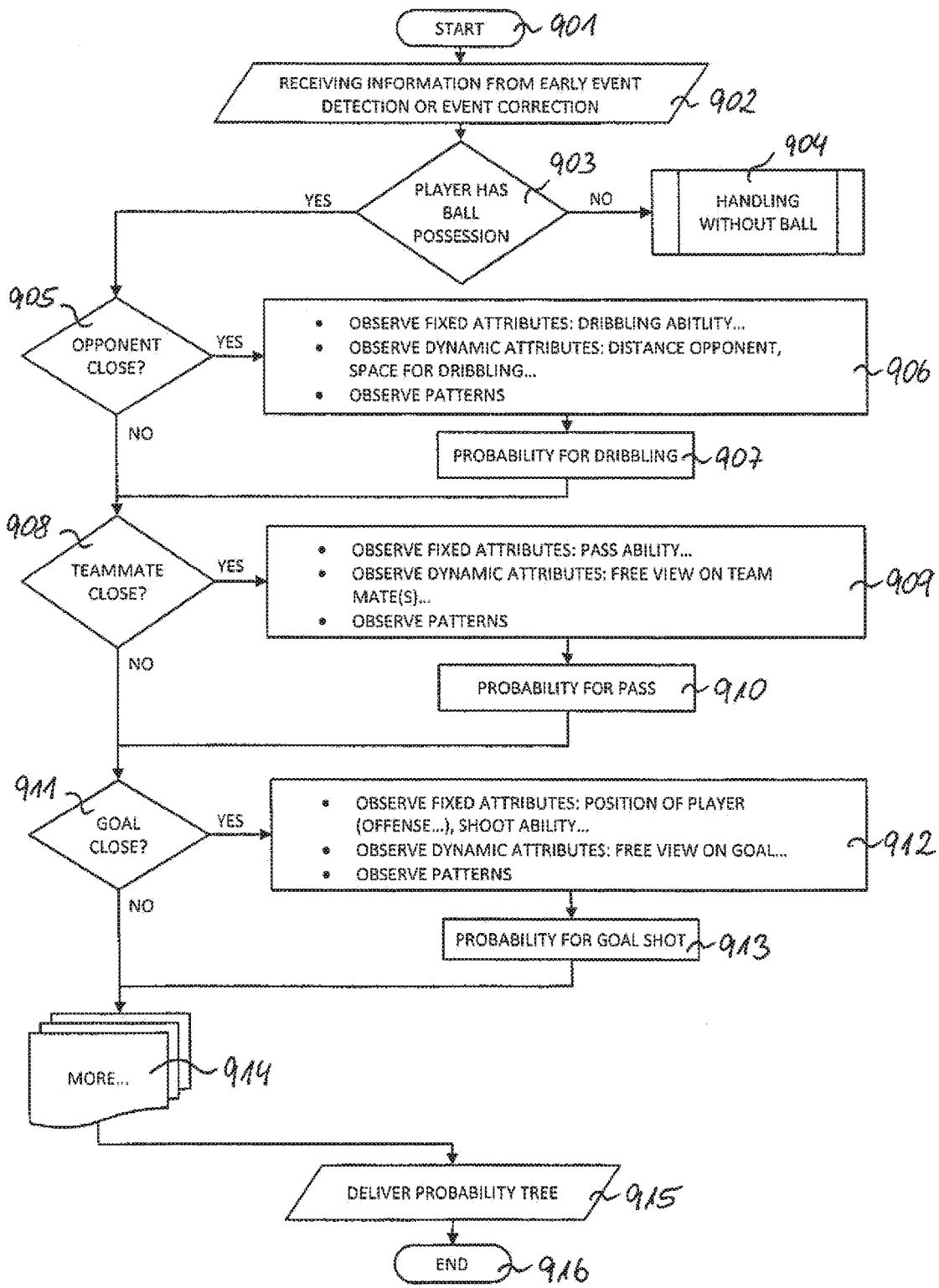
Figure 10:
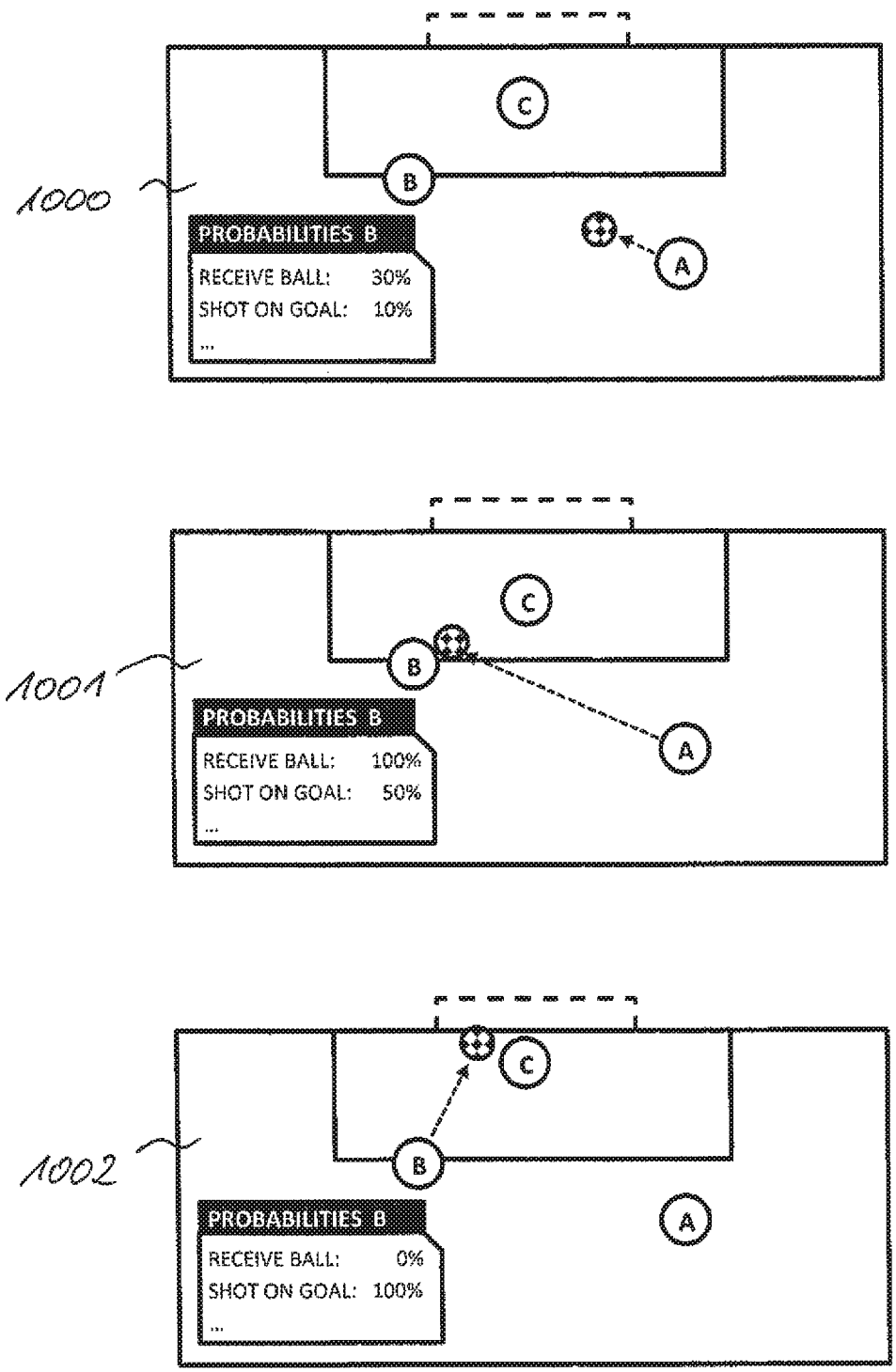
Figure 11:
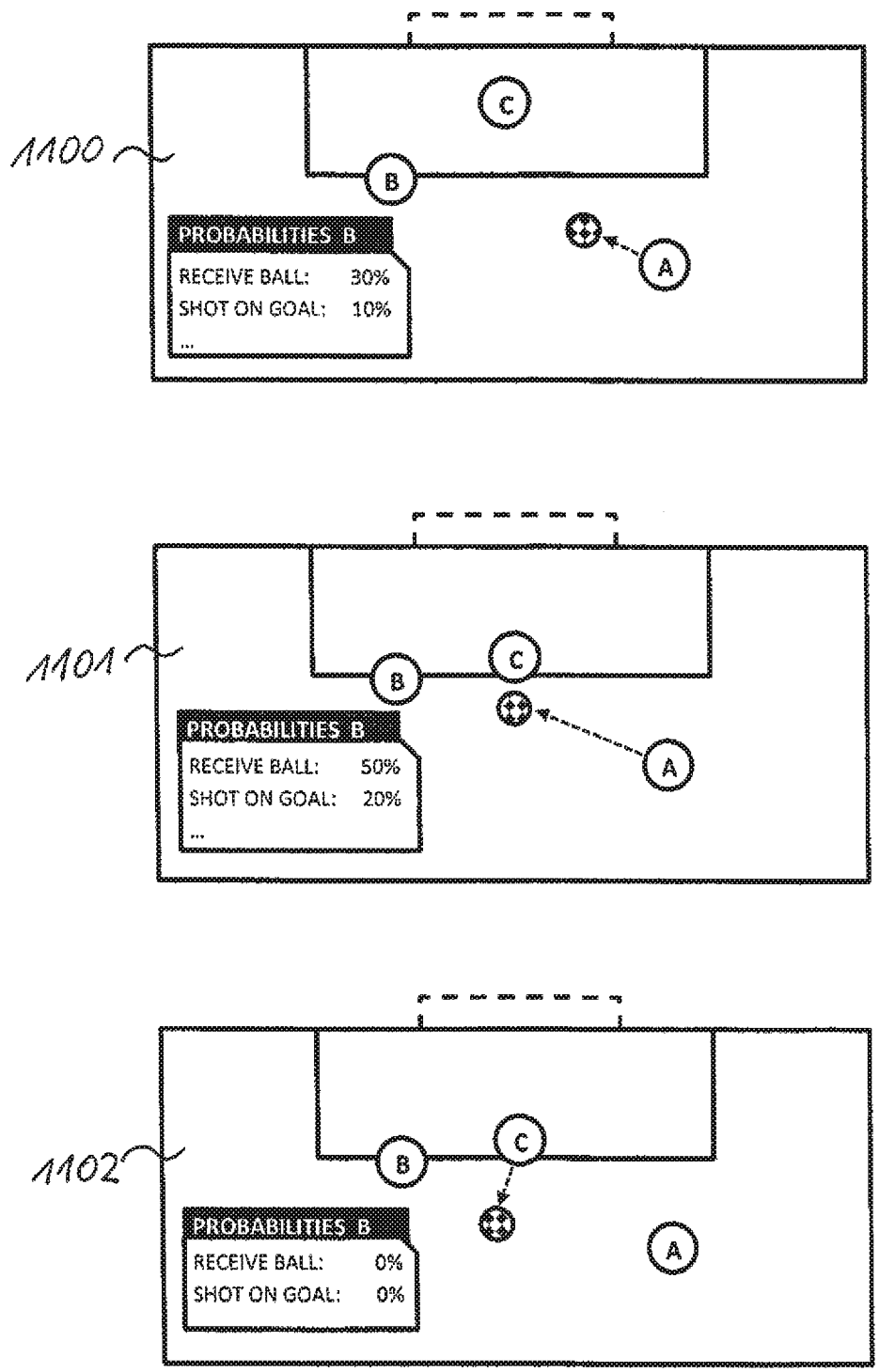
Figure 12:
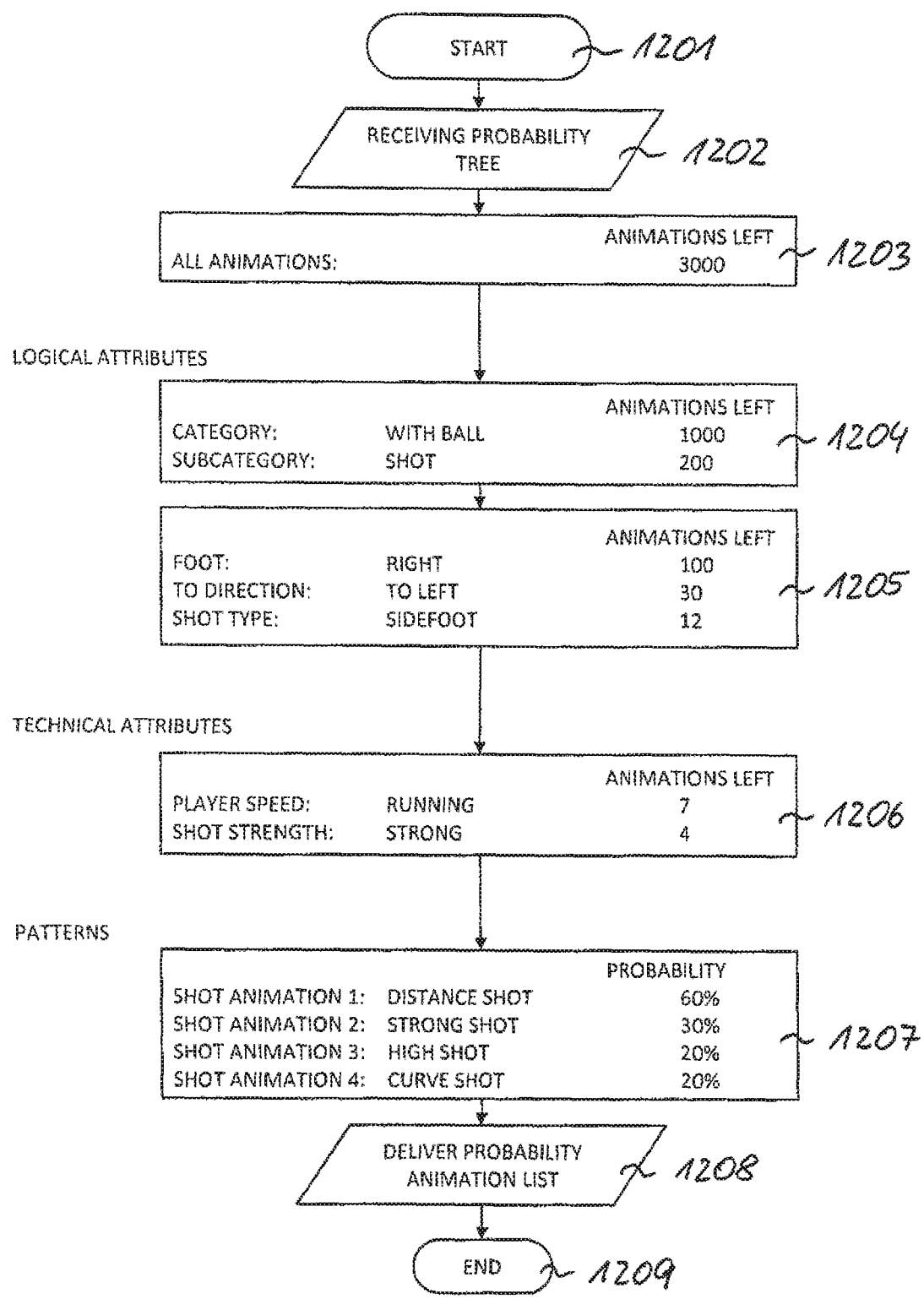
Figure 13:
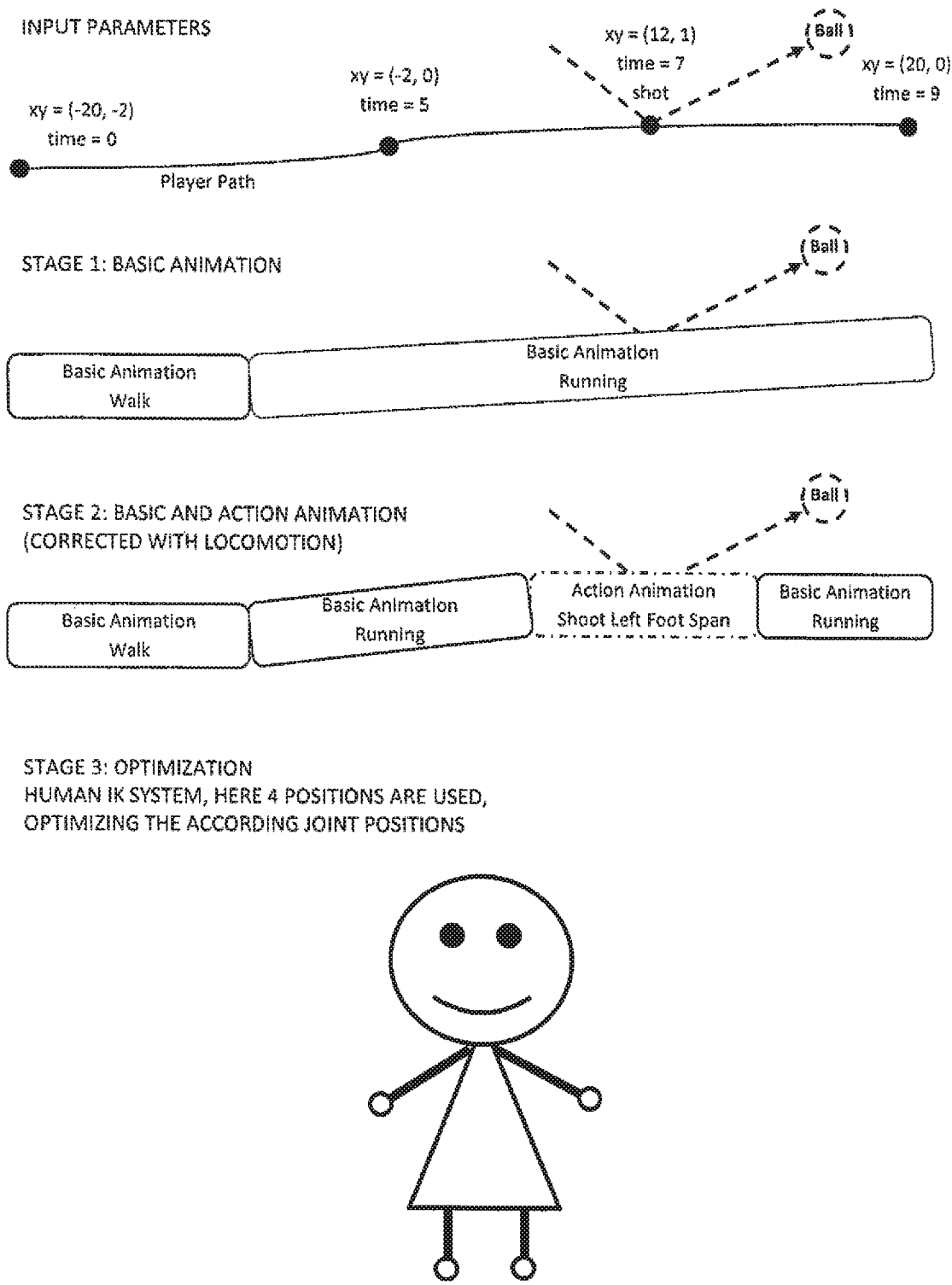
Figure 14:
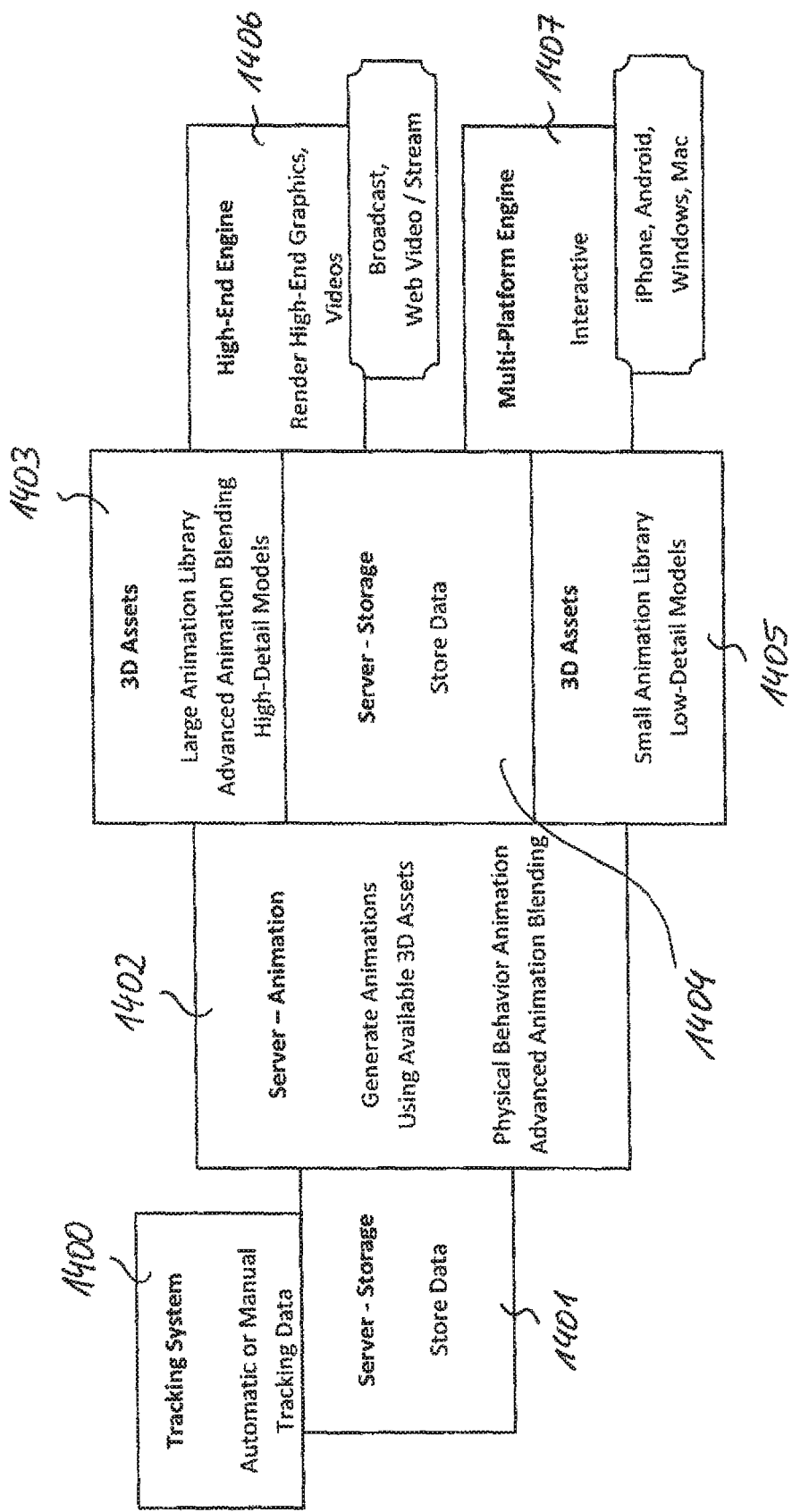
Figure 15:
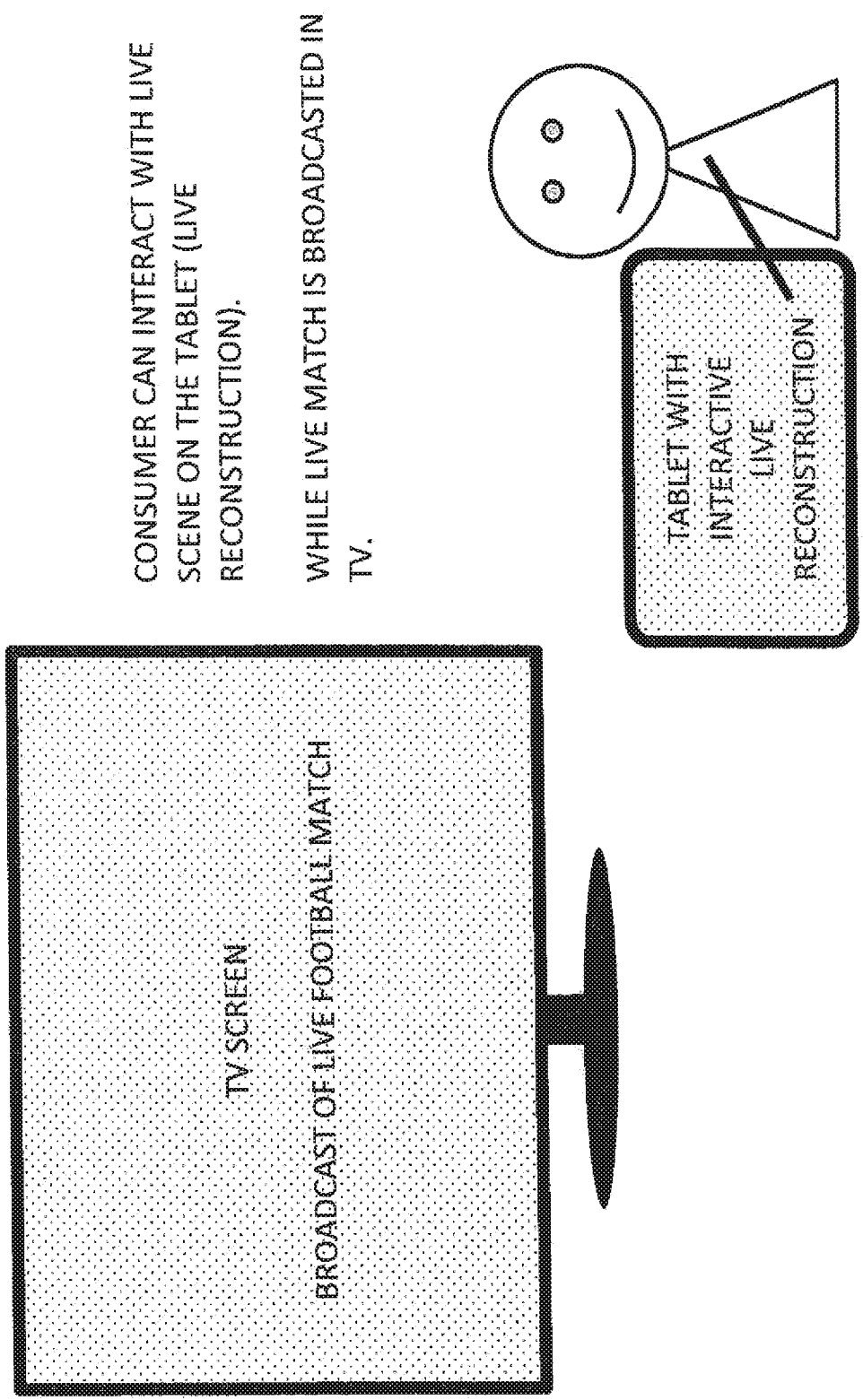
Figure 16:
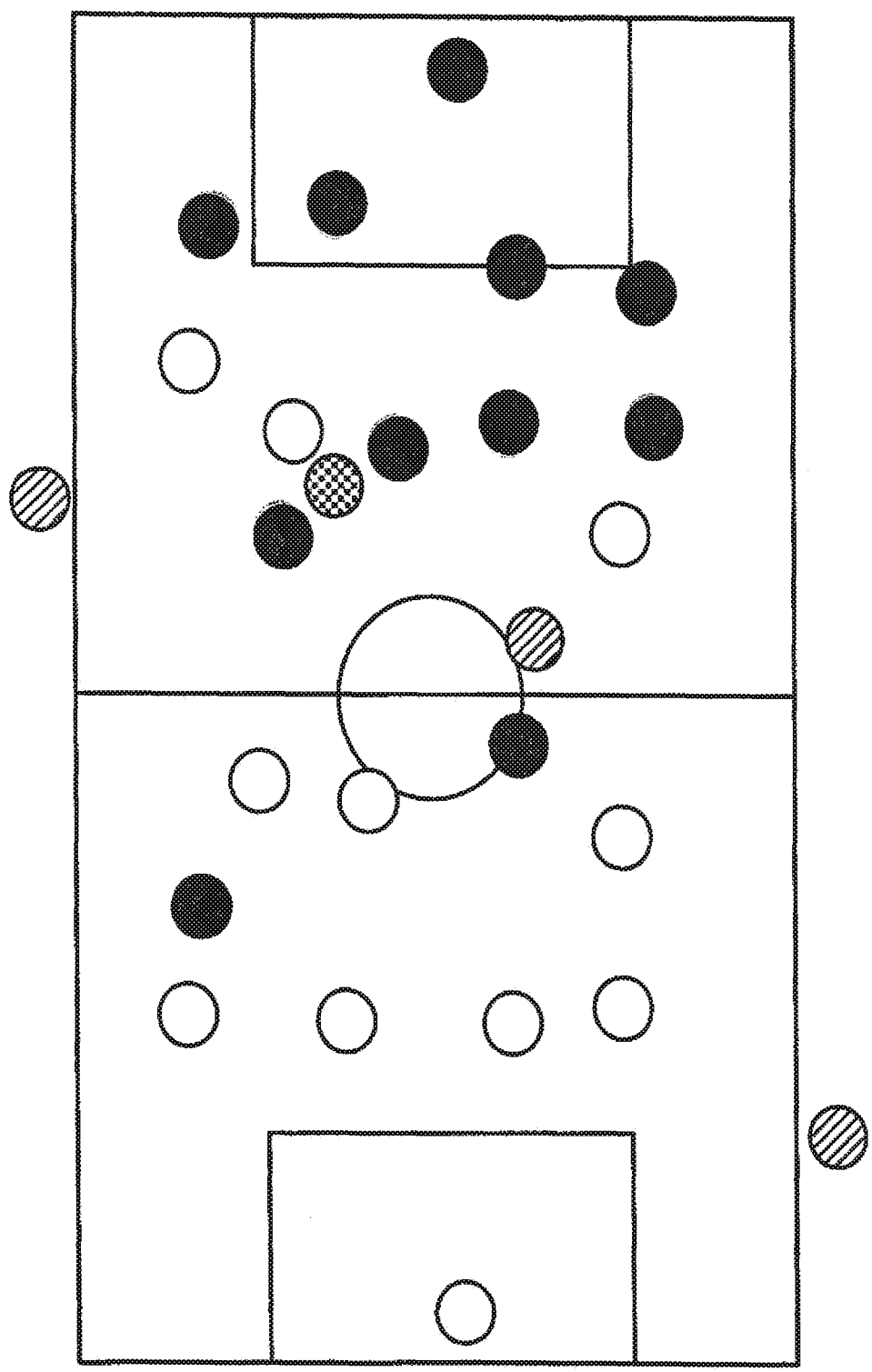

Following, further embodiments will be described, by way of example, with reference to figures. In the figures show:

FIG. 1 a schematic representation of a workflow of incoming positional data which is analysed in the early event detection, with the animation database lookup the best matching animation is found and is inserted into an animation data queue to be rendered, FIG. 2 a schematic representation of an optical 3D tracking system configured to provide positional data with respect to a live scene "football match", FIG. 3 a schematic representation of top view on hip position over time, FIG. 4 a schematic representation for different time notations, FIG. 5 a schematic representation of a football pitch on which zones for a team are indicated playing towards the right goal, FIG. 6 a schematic representation of an action radius and an extended radius for a player, FIG. 7 a schematic block diagram for a process of animation of characters, FIG. 8 a schematic representation of an animation data queue with three stages, FIG. 9 a schematic block diagram for an early event detection, FIG. 10 a schematic representation of live scenes of a football match with respect to early event detection, FIG. 11 a schematic representation of the live scenes in FIG. 10 with respect to early event detection with event correction, FIG. 12 a schematic block diagram for lookup in an animation database, FIG. 13 a schematic representation of reconstruction stages of a 3D animation data set placed in the animation data queue, FIG. 14 a schematic representation of a virtual 3D reconstruction system, FIG. 15 a schematic representation of a double screen system showing the live scene and the virtual 3D reconstructed animation, respectively, and FIG. 16 a schematic representation of a top view of a reconstruction, By sing the input data (positional tracking data) of a real-time tracking system a virtual 3D reconstruction of a live scene may be provided with a short delay. This can result in a realistic visualization of the live scene. It can be individually and interactively controlled—used e.g. for sports analysis of a broadcasted sports event. A reconstruction of a live football match could be interactively viewed, camera and analytical elements individually controlled. The consumer can influence the camera, the visualization and its procedure.

The reconstruction method may use pre-recorded motion-capture animations which may be stored in an animation database along with attributes as the animation's speed and an assigned category (e.g. shot or tackling).

FIG. 1 illustrates the workflow of incoming positional data which is analysed in the early event detection, with the animation database lookup the best matching animation is found and is inserted into the animation queue to be rendered. As the motion-capture animation is not matching the real sports motion in detail using physical behaviours and optimization helps to revise and reapply these specific nuances and detail. The result is a computer graphical visualization of the animation. E.g. it can be used to be embedded m a fully virtual environment or as an overlay to a recorded or live video stream.

Referring to FIG. 1, after starting the procedure in step 100, positional tracking data for a detected live scene are received by a processor of the virtual reconstruction system in step 101. Following, in step 102 an early event detection is performed. As the result of the early event detection 102, an animation data set is provided (step 103). According to the embodiment schematically depicted in FIG. 1, in step 104 the animation data set is corrected providing a corrected animation data set (step 105). Such correction may comprise at least one of animation blending and animation mixing which is described in detail below. Further optimization may be performed in step 106. The animation data set provided by the process is visualized in step 107. In step 108 it is checked whether more animation data shall be outputted. If not, the procedure will end in step 109.

Current techniques on tracking systems (used in sports broadcasting) provide not enough quality for a direct realistic character animation (e.g. with key-frame animation and IK). These systems are providing normally only one positional coordinate for each character (athlete) or object (ball). The solution to this is in having an animation database along with pre-recorded motion-capture animations. Positional data and event detection are used to recognize patterns and find the most likely matching animation. A realistic flawless aesthetic appearing motion is a high priority for the method. In the same way the use of motion capture is also its disadvantage as pre-recorded data varies in certain details from the live scene, it is always an abstraction. To solve this, the incoming data needs to provide additional data for the stage of database pattern matching and later on in the optimization.

The quality of the incoming data can be sparse. Due to the pre-recorded motion capture animations the reconstruction will always look convincing in terms of a realistic motion. A great advantage of the method is its flexibility. It works with very different tracking systems as e.g. for football players a two dimensional (x, y) coordinate representing the position of the player on the football pitch and for a ball three dimensional (x, y, height), its timestamp and a unique id (identifying the player) are needed. Also the time interval at which input data comes in for a certain player can vary. In the end there can be a number of different methods to generate the input data, from manual creation or drawing running traces to video-based or chip-based tracking systems as they are currently used at a growing number of sport events.

High-End tracking systems can provide multiple positions for a single character (e.g. for every hand and foot) these can be used to optimize the reconstruction. Besides the input data, the physics system and logical parameters are also influencing the optimization state. E.g. a football player's head is oriented towards the ball.

The generation of the reconstruction must happen live—only with a short delay to the happening of the live scenes. The method targets a delay of much less than one second, regarding the duration from receiving the positional input data until the current time of animation playback. There are two stages in the workflow which are critical to the delay, namely the event detection and the animation detection. The first is solved with an early event detection, which makes assumptions and probabilities based on the scenery. The latter is solved using a probability list of animations which are inserted into the animation queue and later on can he modified or replaced based on new details detected afterwards in the early event detection and/or changes in the probability list of animations.

Target devices for this second screen experience are personal computers, tablets, smartphones and the television device itself, as most up-to-date device allow downloading and processing of apps. A system had to be developed to allow the reconstructions on each device while regarding its limitations. The proposed system provides different animation sets, for some target devices the number of animations will e.g. be 50 as on high-performance devices there could be more than 1000. Of course influencing download size and computational performance. The animation queue for each device is calculated on a server and only the resulting animation queue data (which is small) is used on the devices.

For the 3D reconstruction to work positional data is needed as an input. So this input data is given or in other words delivered to the method. The input data should minimally be a single position (center of mass) of a characters I objects in the absolute three-dimensional Cartesian coordinate system. In most situations a two-dimensional position for characters is already sufficient e.g. in football. In the technically simplest case one positional coordinate is provided per character and object. The system then uses a lot of assumptions, e.g. for a football the position is given with 25 frames per second, the system now assumes the rotation by applying physical models. E.g. for a football player for its given position the complete pose is an assumption—the system uses speed of the players movement to find a matching animation.

When wanting a live reconstruction an automatic or semi-automatic tracking system may be used. The tracking system may at least deliver positional data multiple times per second with a short delay. Naturally when having only one coordinate per character the animation will differ in a lot of details to the actual occurring. More coordinates for key joints (e.g. feet, hands) of a character are making the quality and the closeness to the real motion radically better.

There are different types of tracking systems present on the market which match the requirements to deliver positional information in real-time. Other techniques as known from motion-capture systems are not in a direct competition to these systems but could evolve into that direction and can potentially be used to deliver the input data. Tracking systems are currently used at a growing number of sport events.

After an introduction of the common types of tracking data systems these are generally referred to "tracking system". FIG. 2 illustrates an example for an optical tracking system where six cameras 200 are placed around a pitch 201 to detect the player's position on the pitch 201 as a 2D coordinate.

As an example, chip (e.g. RFID) based tracking systems are available, such as inmotiotec from Abatec Group AG or RedFIR from Fraunhofer IIS. Chips are attached to the athletes or placed within the ball. Also, optical tracking systems are known. Camera (e.g. stereoscopic cameras) based systems are successfully installed on the broadcast market. Used for large events as FIFA World Cup and UEFA Euro, but also in football leagues. Manufacturer is e.g. Tracab.

There are other systems which could potentially be used, however these deliver data which is so detailed that a direct animation could work well enough, making the system redundant. But e.g. Microsoft's Kinect has the disadvantage of working only for a small number of characters. For motion-capture systems such as from Vicon or XSens, actors have to be equipped with a special suit. Both approaches make it impossible to be used for sports broadcast. But future development might lead into the direction.

There are numerous methods for generating the input data. Besides the automatic or semiautomatic generation from a tracking system, there are also manual approaches. E.g. setting a position at certain key-frames while interpolating positions in between. Or e.g. drawing running traces on a 2D top view of the field. While the system proposed may be working with these approaches a live reconstruction is in this case not possible, as the delay would be much larger.

A configuration is used to inform about certain things important for interpreting the input data. Coordinates of key points as the origin of the coordinate system and e.g. for a football pitch corners, mid-point and position of goals. Also the Ids in the positional data used to identify a position belonging to a certain character or object as referees, players, ball, etc.

A tracking system delivers positional information in real-time, which means with only a short delay and, for example, with a rate of 25 times per second. E.g. for a football player a two dimensional (x, y) coordinate may be provided, which defines the position on the football pitch; for a ball the height should be given additionally. The position may represent the centre of mass I mid or hip position vertically projected onto the football pitch. The accuracy may be less than +/−0.5 meter, and positional coordinates may be represented in an absolute coordinate system.

The time interval at which input data comes in for a certain character or object can vary, so basically it is not important if a character position once every two seconds or 25 times a second. However for the system to work live with only a short delay a position for every character or object position may be provided at least five times a second.

For a football match the tracking system can deliver positions for all players, balls and referees along with an id to uniquely identify these. A tracking system may deliver at least one position per object, but it is also possible delivering multiple positions e.g. for legs, arms, hands, head etc. The more positions are captured the more exact is the event data of the tracking system resulting in a more detailed reconstruction.

If the tracking system delivers more positions per character these may be used in two ways. At first, it may be used for a more detailed animation database lookup to insert the best matching into the animation queue. Secondly, it may be used in addition or as an alternative for the later optimization, e.g. in football the hands for field players are corrected afterwards as the feet are more important.

From the positional data events may be determined which may also be referred to as event detection (see step 102 in FIG. 1). E.g. if an athlete is jumping or shooting a ball by observing the positions an event can be identified. By using logical rules e.g. if a ball moves quickly away from a player an event "shot" can be detected. Further analysis could lead into an event "pass" if it is received by another player or if received by a player of the other team it can be an event "failed pass".

Conventional event detection known as such will lead into a delay as e.g. the failed pass could not be detected at the moment of the shooting the ball, but only a few moments later when the opposing player gets the ball. Event detection may be used for statistics like running distance of a player over the full match, counting of ball contacts or passes where the delay is minor.

As the early event detection may use just positional data as input it is compatible to any tracking system that delivers such data. There are no conventions on which events are detected, tracking systems handle event detection differently and each with its own delay.

The animation techniques used may be as such state of art. These techniques are used extensively and are adopted to match the key focus of delivering a fast reconstruction with good quality. In the following, these known techniques are described on a very basic level.

A categorization into characters and objects may be done which is only exemplary to describe the workflow. Techniques used by either of these can also be useful for the other and can be mixed. Both terms are used hereafter whenever either category makes more sense for description purposes. Objects as a ball of a football match. Has no complex animation by itself, so motion-capture doesn't make sense, but a physical simulation. If a ball is falling to the ground it bounces up again and rotates. This slight behaviour is hard to be correctly delivered by tracking systems. As the convincing animation is the highest priority it is simulated by a physical model, rather than being as close as possible to the live reference. This ensures the convincing movement of ball—in the same manner as for characters this is an abstraction of the live scene. A character has human like or related attributes as several joints as elbows and knees. The animation is complex. Pace, motion and physical behavior are aspects which cannot be simulated easily. To overcome this situation pre-recorded animations are placed optimally in an animation queue. But in certain cases also here a physical simulation can be useful as described in a physical behaviour. The character workflow is more complex and is described in the following chapters.

Prior to the real-time virtual 30 reconstruction of a live scene, motion-capture animations are recorded in a studio or on the football pitch, captured by the motion-capture systems. Motioncapturing is a technology known as such in different configurations. E.g. Vicon and XSens are vendors of such systems. The technology is further described in Menache, Understanding Motion Capture for Computer Animation, (2nd Edition) from Alberto published by Morgan Kaufmann (ISBN: 978-0123814968, 2010) and Kitagawa et al., MoCap for Artists: Workflow and Techniques for Motion Capture, published by Butterworth Heinemann (ISBN: 978-024081000 3, 2008).

8 illustrates an animation queue where animation blending and mixing are used, e.g. in Stage 1, a 'Walking' animation 804 is blended into 'Running' 806. And a '30% Walking' animation 805 is mixed with '70% Running' 808.

Animation data sets representing the animations to be outputted are placed in order in an animation data queue. Each animation represented by an animation data set starts at a certain time and ends at a certain time. During a live animation only two may be active at a given moment. It is possible to smoothly blend between two animations and also to mix two animations.

The animations placed in the animation data queue may be amended. One kind of such amendment may be referred to as animation blending which is to change the weight of two animations to blend the active animation over into the other. Such process may also be referred as cross-fading. The length of the transition is relevant.

Throughout this short time range both animations have to be as similar as possible to proceed a smooth blending. The information are stored as a transition in the animation database, holding all matching poses between two animations that are good enough to proceed a well looking blending.

Another process for amending the animation data queue may be referred to as animation mixing. Rather than blending between two animations in this technique these are mixed over a period of time. One jumping while running animation and a running animation mixed can lead into a lower jumping while running animation. Animation mixing overcomes animation blending in terms of complexity. In animation blending a single time range is used to blend over. In animation mixing a transition graph is generated resulting in a path which is the best way to blend into the other animation for every frame. So at each time the animation can be blended over, with the effect that these can be mixed fluently.

A locomotion process may be used for overcoming problems of animation blending and/or animation mixing. Sometimes feet are sliding while blending or mixing. This happens as both poses are slightly different over the blending time range while both animations might fit well at exactly in one frame in their poses. Animation method for changing animations e.g. a running animation the step length is changed—shortened/widened. The motion itself stays intact but is adjusted to fit another distance or match another speed. This solves problems as that the feet are not sliding. Another field of locomotion is e.g. to walk hill upwards or walking a curve where the footsteps have to move upwards or sideward at each step. There are a number of publications to this, Park et al., On-line Locomotion Generation Based on Motion Blending, published by ACM in SCA, 02 Proceedings of the 2002 ACM SIGGRAPH/Eurographics symposium on Computer animation (p. 105-111, 2002. ISBN: 1-58113-5734); and Johansen, Automated Semi-Procedural Animation for Character Locomotion (published as Master Thesis at Departmentof Information and Media Studies at Aarhus University, 2009).

During an optimization stage kinematics may be used, Inverse kinematics are imaginable to a Marionette like system, when setting the position of a hand, arm and elbow will follow. Furthermore Human IK is a specific system for humanoid characters where in this example the hand of an upright standing character could be set to the ground—the body of the character will bow physically correct to match that hand position. This is used to try matching a pose or e.g. feet.

A physical model may be used for providing certain input parameters to a model, as distinctive positional coordinates and speed for a ball. With the physical model a trajectory is rendered to provide the curve the ball travels and its rotation.

A physical behaviour refers to a more complex logical behaviour and may take into account the complex behaviour of humans in terms of body parts and logic. An example is the collision of two characters. The collision may happen under unique circumstances as players run at a different speed and direction each time and therefor tackle each other at other body parts with another force. It is impossible to cover all different variations of the collision with motion-capture so the tackling needs to be simulated. Input parameters could be a position and a force which is exerted. E.g. on the upper body, which lets the character fall down in a realistic way. The animation for this is completely calculated in a realistic way. It is possible however to provide a normal animation at which the physical behaviour outgoing and takes responsibility for the following behaviour. In some cases the physical behaviour makes sense and is preferred over the standard motion-capture animation for character e.g. if these tackle each other in a unique way where not motion-capture animation has been recorded before. However the physical simulation only can be applied in special cases where a physical interaction and forces are applied, e.g. a standard walking animation currently can't be done with a physical simulation. A high-end system is e.g. euphoria from NaturalMotion.

An extreme example is for american football when all players are jumping onto each other trying to get the ball, this is hardly achievable to be covered with motion capturing and targeting a reconstruction later—as the behaviour of the players is always unique (players are at different positions etc.).

The animation database may be created upfront for a certain discipline, such as football. It is created a long term (months) before the actual generation of the real-time animation, as it takes time to integrate animations and logic for that discipline into the system—foremost animations have to be recorded with motion-capture and integrated into the database.

The sport discipline to be reconstructed has to be analyzed. A list of unique motions which are executed by the athletes has to be created. Often these are more than a thousand animations e.g. a hundred different variations of a shot. An actor (football player) is executing the motions from the list while ensuring that their appeal is as similar as possible to the motions that most athletes will execute. Additionally there are animations recorded with two or three actors at once and with the ball being involved as tackling or shots. The individual motions for each actor/ball are separated in the animation database but its relationship is stored and can be used to recreate the interaction between athletes/ball in the animation queue for playback.

Each animation has a length of normally less than a second or a few seconds. E.g. a running loop, a trick shot with the left foot etc. Animation is mirrored automatically which doubles the amount of animations in the database. Most animations are a bit longer ahead and behind than the actual action (e.g. shot)—to be used for blending it over into other animations.

A motion-capture animation can be split into segments itself e.g. to use the animation of the upper and lower body separately, which is also stored in the database. In some cases this can be useful to have an optimized blending or better fitting reconstruction.

The animation database lookup will be more accurate the more detailed the input pattern is. In simple terms an input can be a certain action, like a shot or e.g. a combination of positions of a hip and joints like the left foot. During the lookup the animation database is parsed using the input parameters. The actual lookup detects motion patterns over multiple frames and not single poses at a frame. The best matching animation will be inserted into the animation queue. The result is a reconstruction where the virtual character's motions match those of the real athlete. E.g. while running the left foot will be in front of the character (in the reconstruction) whenever it is in the live scene. An exemplary animation database lookup is illustrated in FIG. 12.

To enable a fast animation database lookup, attributes may be defined for each animation. Basically attributes are metadata which distinct the animations from each other e.g. the information if the animation includes a ball. For a shot this would be true and for a running animation it wouldn't.

Logical attributes may be partially generated automatically, but some information is may be provided manually by an operator. Some examples are: Category of the animation (running, shot, tackling . . . ) with subcategories e.g. for shot (pass, goal shot. . . ). Additional information e.g. for a shot with which foot it is executed, furthermore if with the side foot, a full instep kick, etc. If the animation is loopable—true if the animation can be restarted from beginning after it ends.

Probability—how often will the animation probably be placed in the animation queue. E.g. a running animation is used very often, an overhead kick only rarely.

Technical attributes in general may be automatically apprehended attributes retrieved by observing the animation files. Some examples are: (i) Average speed—speed of different phases e.g. beginning phase (0%-20% of length), ending phase (80%-100% of length) and in the middle; (ii) spacial trajectory which the hip of a character moves along.

If animation interacts with object (ball) or character (teammate or opponent). Some attributes can be adapted to better match the input of the lookup. For example the speed of animation can be modified—if the animation has a length of one second it can be played with double speed, so the motion is executed faster and then has a length of 0.5 seconds.

Movement patterns for player and ball like their trajectories (e.g. special movement of hip of the player over the length of an animation) can be compared to the incoming positional data. If logical and technical attributes basically match and deliver four usable animations (like in FIG. 12) these patterns help to refine the probabilities for each of those animations. FIG. 3 illustrates a trajectory of hip positions (curved line) over time of an exemplary animation from a top view (XZ-axes). FIG. 3 shows the path of an animation from top view. This path can be rotated and its speed adapted. Points A, B and C can be part of the pattern lookup and used for the first lookup if these are adequate the trajectory is checked in further detail. A is a position of the hip in first frame of the animation. B is a position in middle frame. C is a position in last frame. If the input data includes a ball close to the position of the player or the player is interacting with the ball, the pattern lookup searches primarily for animations which include a ball, the trajectory within the positional input data and the animation from the database are compared and therefore influence the probability/result.

An additional pattern approach is to use usage details. Whenever an animation is placed in the animation queue for playback this usage information will be inserted into the database. E.g. a count of how often the animation has been inserted into an animation queue, the summed duration of usage, under which circumstances which detected events or input patterns) and also information about the animation which has been inserted directly before and after this animation in the queue. The result is a complex graph providing information on how well the animation fits into the given queue under the current circumstances.

Information to blend and mix animations may be automatically generated through finding matching poses between two animations, and are in some cases optimized manually. These are stored as transitions and transition graphs. This enables blending at certain frames and mixing of animations at any time.

Following, further aspects of the virtual 3D reconstruction technology are described.

Position, timestamp and id of the players are received at intervals from the tracking system and used to generate a 3D reconstruction of the athletes' motions and objects as the football—resulting in a computer graphical visualization. For a motion-capture animation which has a length of a second the delay normally would be a second. A second of positional data has to be received and only then the decision could be made if it is the best matching animation.

There are situations where this is not a problem e.g. a broadcast-signal from a live event is normally also a few seconds behind the live event until it appears on the television screen of the consumer. So theoretically the reconstruction could still be in sync with the broadcast, but in certain cases the delay has to be as short as possible, as there are steps to make the visualization available to consumers etc. which also need some time.

To enable a workflow which is as fast as possible—early event detection is used—the generated probability tree and probability animation list retrieved from the animation database lookup are the key elements in this solution.

The FIG. 4 illustrates the different time notations that are used in this process: between playback time and live time is a delayed time range and beginning at live time into the future the prediction time range. In FIG. 4, A represents an offense player running towards goal and B represents a goalkeeper of the other team, defending goal. FIG. 4 shows changes of early event detection over three exemplary live times, given live time is the moment or time at the live time (current time of live event). Before the playback time is the past, animations have already been placed in the animation data queue and cannot be changed. The playback time is the current time of playback in the animation data queue. Any animation or animation weight after this time can be changed, which is done by the early event detection, and used as forenm. Actions which have been detected in the delayed time range did already happen, these have a high influence (e.g. 70%), whereas actions predicted within the prediction time range have a low influence (e.g. 30%) in the early event detection. But the influence values vary, depending on the situation and actions (dynamic attributes). The delayed time range is normally small (e.g. 0.1 s) and the prediction time range longer (e.g. 1 s). Early event detection, event correction and the placing in the animation queue may be processed in an interval of at least about 25 to 50 times per second.

In the case of football two ways for animating the ball object may be considered. First is using the trajectory from motion capturing the other to use a physical model to simulate the behaviour of the ball. Both can be mixed, depending on the situation.

A physical model may be used for animating the object in a realistic way, it just needs a minimum amount of input parameters e.g. certain key positions, speed and acceleration. Ball curve, bouncing or collision with other objects are calculated by the model. E.g. for the ball an assumption of the ball's flying curve will be simulated, which might differ from the coordinates and timing of the positional input data. When the ball is high in the air flying a curve this is normally not a problem as long as the start and landing point of the ball match with reality, so these key points are set as fixed for the physical model.

If the ball trajectory comes from motion capturing it also differs from reality. E.g. if a player is dribbling, the positional input from the tracking system might not be used at all, as a perfect animation might not be found in the database. From this input data just the information that the player is in ball possession and dribbling is used, while the realistic animation of the ball comes partly from the motion-capture animation itself (where the ball was recorded along with the player) and can be partly simulated and corrected by the physical model.

Another role of the physical model is to calculate an assumption of the ball trajectory e.g. right at the beginning of a shot. The assumption of the trajectory can be used in the early event detection for the dynamic parameters (where the position of the ball is used). So it has influence on the probability tree of the characters, Early event detection is used which may be implemented with a so-called probability tree. The focus of the probability tree is to always have up-to-date information on possible trends, to know as early as possible if the chance for an upcoming shot arrives or into which direction it goes. To solve this, early event detection works with assumptions and probabilities. Based on the current situation certain attributes (dynamic attributes) are apprehended—these together with attributes that are retrieved before a match for every player (fixed attributes) are used to guess how the player will probably act next. This approach can be implemented with a state machine for each player, AI uses each player/ball and their states to better predict their actions. An action is for example a shot on the goal, a dribbling or a tackling. Apart from that early event detection is also about simple logic like standing, walking or running, this is a standard behaviour for which no complex predictions have to be made. E.g. the current running speed and direction and predictions for these are used as an input for the early event detection and therefor do have an influence on the players next actions.

Fixed attributes are set before a match. Some examples are: General position of player (offense, defense, goalkeeper . . . ); and abilities of player (skills for shooting, passing, tackling, dribbling . . . ). Dynamic attributes are dynamically apprehended at current moment of the live scene. Examples are: Current position of opponent players and teammates (chance for pass); and the player having free view (goal shot possibility) at goal, which can influence a possible shot on the goal.

In which zone of the field the player is highly influences its behaviour. In front of the opponent's goal the player's offense acting is more crucial, dribbling gets more difficult as defenders are more attentive, so the opponent might tackle etc. In the neutral zone in the midfield the actions would be more considerate. A simple zone classification is illustrated in FIG. 5. Action radius and extended action radius may be used. If ball is in action radius (close) or extended radius (pass possibility) is important for the eventual event. Passes are more likely the closer a teammate is as illustrated in FIG. 6. Condition, updated attributes of the players abilities (fixed attributes), which can change over the runtime of the match, e.g. endurance level will decrease if he is running a lot.

Changes of dynamic attributes over time (e.g. 1 second range before live time), e.g. if for the goalkeeper 'caught ball' has been detected (is within 1 s range), probabilities for him securing the ball will be high, followed by a throwing of the ball towards a teammate.

Predictions can be influenced based on other players actual actions and probabilities, e.g. if it probability for a forwarder for making a shot on goal is high, the goalkeepers probability for trying to catch the ball will increase.

Action radius and extended action radius are used. Whether the ball is in action radius (close) or extended radius (pass possibility) is important for the eventual event. Passes are more likely the closer a teammate is.

FIG. 7 shows a schematic block diagram for a process of animation of characters.

After starting the process in step 700, information about the event determined is received in step 701. According to step 702, an animation database is looked up for providing, according to step 703, a basic animation represented by a basic animation dataset. In step 704 it is checked whether the animation represented by the basic animation data set needs correction. If it is determined that correction is needed in step 705 correction of the basic 3D animation data set is done. The event correction is further described below. If, according step 706, the selected 3D animation data set is sufficient, at least one of action animation and physical behaviour is used in step 707. In case of use of action animation the animation database is looked up and action animation is received according to steps 708, 709. Physical behavior may be used according to step 710, finally providing optimized animation data in step 711. The process is ended in step 712.

The probabilities can be influenced by a pattern recognition which observes patterns m situation and (tactical) movement of players.

FIG. 8 illustrates an exemplary animation queue of a character. Stage 1 is a basic animation, which is a blending of two animations. Stage 2 is a here—action animation and physical behavior basic animation. Stage 3 is an optimization stage that includes correction of details, has its own weight, and can he only on certain body parts (Here-Foot). The live time is current time of the live event, e.g. a football match 802. The delayed time is the current time of animation playback (virtual 3D reconstruction) 801. Depicted left to the delayed time is the past—animations in the queue which already have been played. Between delayed time and live time is a small buffer, the above described delay. Right to the live time is the prediction time range 803, which is generated based on the results of probability tree and list, and is a prediction of the future events of the player. There are three stages in the animation data queue. Stage 1 809 is the basic animation e.g. general idle, walking and running animations. Stage 2 812 is the action animation combined with the physical behaviour. Stage 3 814 is the optimization stage. All stages can be mixed to certain amounts and also in a way that only affect parts of the player's body e.g. an optimization stage 814 might only correct the left foot to match a ball trajectory 813—which is an addition to the full body animation resulting from Stage 1 and 2. In FIG. 8 Stage 1 and Stage 2 have a summed weight of 100% at each time—the weight is illustrated by the height of each animation, a 100% is filling out the full height as in 'Walking' '804 of a layer (Stage 1 consists of two layers) while a weight of 30% (as for the '30% Walking' animation 805 fills out 30% of the layer's height. There are often cases where an animation of a layer is blended out and another is blended in—e.g. at delayed time where 'Running' 806 starts to fade out and 'Action Animation Goal Shot' 810 starts to fade in. The two animations of Stage 2 overlay a '0% Running' 807 animation of Stage 1—this allows to have no influence of the 'Running' animation while the 'Action Animation Goal Shot' and 'Physical Behaviour Collision with Opponent' 811 is played, Below the stages there are three descriptions of remarkable time stamps. The left mark 815 indicates the moment of the goal shot as it has been detected by the event detection—this moment has to match the moment of the shot in the animation 'Action Animation Goal Shot'. A second line mark 816 indicates the adjusted moment where the '0% Running' animation of Stage 1 is adjusted to the moment where the 'Action Animation Goal Shot' is faded out to make the blending work. A third line 817 marks the moment where 'Physical Behaviour Collision with Opponent' fades out and a mix of '30% Walking' and '70% Running' 805, 808 fades in.

FIG. 9 shows a section of the early event detection. It starts with receiving the information from early event detection or event correction 901, 902 from the last iteration or preceding part of the event algorithm. In reference 903 it is decided if the player has currently ball possession. Reference 904 would be the handling without a ball—in this simplified example of a subordinate branch of a tree the offense player has the ball. There are three leafs for which a probability is calculated for: dribbling 907, pass 910, goal shot 913. These are retrieved by observing attributes of the current situation. E.g. in reference 905 it is checked if an opponent is within the extended radius of the player, if so fixed and dynamic attributes are observed in reference 906 the concept is explained above. If the opponent is not within the action radius, the player has enough space for dribbling therefor resulting in a higher probability for dribbling 907. In a similar way probabilities are calculated for a pass observing the current situation, if it allows a pass to a teammate 908, 909 and 910.

For the condition "Goal Close" 911 the fixed attributes of the position of a player and its shoot ability are observed 912. In this case it's an offense player which has a strong shot. If the observed dynamic attributes reveal a free view to the goal and the distance is within the extended radius it results in a high probability that (reference 913) the player will take a shot on the goal. By using patterns for situations (e.g. general movement of all players, as seen from top-view or the movement of individual players) reoccurring situations can be identified and used for enhancing the probabilities.

This is a small excerpt from a full tree, one possible branch—there can be many more attributes, branches and sub branches (as indicated by reference 914) and a probability like pass can be refined into a probability for a short/long pass, low/high pass etc.

The probability tree is generated for each player (step 915). The probability tree for basic animation is different of those for action animation as the number of possible outcomes/animations is smaller for the basic animation (e.g. walk and running cycles). For the action animation the delivered tree is larger as there are more opportunities which the player can probably do (e.g. many variations of shooting, tackling, dribbling).

The early event detection which results in a probability tree.

Following, a further example is referred to.

FIG. 10 illustrates the early event detection from the top-view on a football pitch. The probabilities for player B change throughout the different moments of the scene. B's chances to receive the ball increase as the ball comes towards him until finally to 100% when he received the ball. When the probability increases over a threshold (e.g. 40%) the animation is inserted into the animation queue for playback. If the probability for Shot on Goal grows over the threshold both animations are mixed. E.g. receive ball animation is played with a weight of 67% (while having 70% probability) and the shot on goal animation is played with a weight of 33% (while having 55% probability). Both animations are played and the mix weights change during the process of the scene and its probabilities.

There are certain rules to each sport event which have to be regarded and detected, which can influence the dynamic attributes. E.g. the rules for football: offside, goal, throw in etc. This makes the configuration of the early event detection specific to a sport.

An event correction observes the probability tree, probability list and the active animations in the queue. If the observations are resulting in a needed correction to the animation queue, it is adjusted to match the new circumstances e.g. a new animation has to be inserted. For the case that an action animation has already been inserted and playback has been started, the mechanism is to correct the animation queue in blending the unneeded animation out and blending the correct one in, or adjusting an existing one so that it matches the new requirements. The event correction may be part of the workflow as illustrated in FIG. 1. FIG. 7 illustrates its place directly after stage 1 (reference 703)—basic animation and before stage 2 starts (reference 706).

FIG. 11 illustrates a similar scene as in FIG. 10, but in this case goalkeeper C gets into the way and catches the ball before player B can receive it. At first the receive ball animation is inserted into the animation queue but is then aborted when goalkeeper C catches the ball. The receive ball animation's weight is decreasing quickly towards 0% and is overlaid by a normal running animation whose weight increases.

Referring to FIG. 10, three frames 1000, 1001, 1002 are depicted.

With respect to frame 1000 (first frame), the following scene is shown: Forwarder A is running towards goal and making a shot in direction of teammate B. The probabilities are as follows: At the current moment the probability of teammate B for receiving the ball is at 30% and for shot on goal at 10% (based on: B position close to opponents goal, position of ball, A and C.

With respect to frame 1002 (second frame), the following scene is shown: Teammate B is receiving the ball from A. The probabilities are as follows: At the current moment the probability of teammate B for receiving the ball is at 100% (based on: just receives the ball) and for shot on goal at 50% (based on: Position close to opponents goal, position of C).

With respect to frame 1003, the following scene is shown: Teammate B is executing a shot towards the goal. The probabilities are as follows: At the current moment the probability of teammate B for receiving the ball is at 0% and for shot on goal at 100% (based on: Just executes a shot on goal).

Referring to FIG. 11, three frames 1100, 1101, 1102 are depicted.

With respect to frame 1100 (first frame), the following scene is shown: Forwarder A is running towards goal and making a shot in direction of teammate B. The probabilities are as follows: At the current moment the probability of teammate B for receiving the ball is at 30% and for shot on goal at 10% (based on: B position close to opponents goal, position of ball A, and C).

With respect to frame 1102 (second frame), the following scene is shown: Suddenly goalkeeper C is going to jump towards the ball. The probabilities are as follows: At the current moment the probability of teammate B for receiving the ball is at 50% (based on: just before the catching) and for shot on goal at 20% (based on: Position close to opponents goal, position of C).

With respect to frame 1103 (third frame), the following scene is shown: Teammate C catched the ball and is shooting it out of the danger zone. The probabilities are as follows: At the current moment the probability of teammate B for receiving the ball is at 0% and for shot on goal at 0% (based on: opponent Chas ball).

The probability tree provides information to lookup the animation database to search for possible animations for the player. Logical, technical attributes and patterns are explained above in Animation Database. These are attributes of the stored animations, whereas fixed and dynamic attributes as explained in Early Event Detection are attributes of the probability tree and are bound to the actual player and scene.

One position is provided for each player at each time (e.g. 25 times per second). At least it is needed to define a pattern and to perform a lookup.

Additional positions would be used for distinctive body parts as feet or arms, these are used to match in more details to the live scene. If left foot is in front it would be inserted like that in the animation queue.

A probability animation list is generated. The target is to find the animations which could be used for the current situation—FIG. 12 illustrates this principle. After starting the process in step 1201 the probability tree is received (step 1202). The use of the information "Has Ball Possession" from the probability tree reduces the number of possible animations our example from 3000 (all animation, step 1203) to 1000 (animations in category 'With Ball', step 1204) as e.g. ones are excluded where a player stands or jumps for a header. As the exemplary probability tree indicates to lookup a shot 200 possible animations are left (1204). Further observing logical attributes, e.g. the player shoots with the tight foot to the left using a sidefoot shot (seen from his orientation, step 1205), which gives 12 animations left. Technical attributes as the current running speed of the player and its shot strength will further reduce the amount of possible animations to 4 animations in the end (step 1206). The resulting probability animation list 1208 includes a probability for each of these four animations 1207. This probability can further be enhanced by observing movement patterns on the positional data (and ball). The more positional and further information are received for a single player at each time the better the pattern recognition is.

Whereas the workflow for objects is based on physics as described above the reconstruction of characters is different utilizing various animation techniques. As an advantage of the workflow the reconstruction will always look realistic, but varies from the real motion due to the pre-recorded motion capture animation and physical simulation. To solve this, the animation will be placed ideal in the animation queue—e.g. in a way that the feet position matches and also during the optimization step afterwards important details will be adjusted to match the real motion better.

FIG. 7 illustrates the general method for the reconstruction of characters. Multiple stages (layers) are used for organizational purposes; these can differ for other disciplines of sports or usage. FIG. 8 shows the different stages, layers and the usage of weights.

The early event detection results in a Probability Tree (FIG. 9) and finally in a Probability Animation List (FIG. 12). This information is used to generate the following three stages of the animation data queue.

In a stage 1 a basic animation is provided (step 809). It is a basic layer of the animation queue which is always generated, so overlaid animation can be blended in and out at any time. Event correction, if an Event of the Early Event Detection has been detected as wrong afterwards an event correction is done. This means already inserted animations into the queue might be cancelled and another animation be inserted based on the results.

In a stage 2 action animation and/or physical behaviour (step 812) may be used for amendment or correction of the basic animation. For specific actions, e.g. shot or tackling, this stage may be used. Action animation works similar to the basic animation with motioncapture animations. Physical behaviour is in some cases used in combination or instead. Animations of stage 2 may have a higher priority, so overwrite animation data sets of stage 1, for the case that an action animation is played with a weight of 100%.

In a stage 3 an optimization (step 814) of the animation data sets may be done. The focus may be to get closer again to reality, to adjust the convincing realistic animation in a way that it stays convincing, but details are adjusted to match reality.

The intention of the first stage is to provide a basic animation which can always be used or can always be blended into from action animation or physical behaviour. So it is always part of the animation queue, even if its weight is 0 (e.g. actually a shot (from stage 2) overlays the basic animation). In such case when the basic animation is completely blended out it can be adjusted to match the overlay animation, so that at any time a blending into a running animation can be proceeded. Besides this it does have its own probability tree, performs a different animation database lookup than the action animation and therefor results in its own probability list.

Animations used in this stage include basic movement as idle, walk, trot, running, running sideward and the like—also including animations for ball control like dribbling but not any actions as shooting, tackling etc. Most basic animations are loopable, but there are exceptions (e.g. making a sudden side step). The probability tree is different to the action animations and e.g. doesn't handle or has a detection for a shot as the action animation's tree like in FIG. 9. The number of animations is much smaller than for the action animation so also the animation database lookup is reduced resulting in a smaller probability animation list.

When further positions are received the system will consider these, e.g. positions for the feet will make sure these are matching in the resulting animation.

The animations can be split into upper and lower body, e.g. therefore just a lower body animation for running could be used whereas the upper body is still doing an action animation. In addition the blending can be varied for both. E.g, for a case that in both animations the lower body movements are matching well, the lower body could be blended in a short time into the other animation and the upper body could be blended slowly when its movements are very different.

Within the predicted time range a pre-recognition will use detected event assumptions to process a lookup in the animation database and insert the best matching animation into the (future) animation queue. As it only a prediction further event details can come in some time later—the animation will be adjusted, quickly blended into another or replaced by another one, Action animations may overlay the basic animation, but will only be active when an action animation should be played as described in FIG. 8 and FIG. 13 (Stage 2). If the moment of the player shooting a ball arrives (step 815), the shot is detected by the early event detection which refreshes the probability tree (exemplary illustrated in FIG. 9). A specific shot action animation will be delivered by the animation database lookup as in FIG. 12. The animation with the highest priority will be inserted into the animation queue and its weight will increase when either the important part of the animation comes closer (moment of shot) or the probability (in probability animation list) rises above all other options. Furthermore the event correction detects possible errors in this stage and solves these.

The insertion of an action animation is illustrated in FIG. 13. The basic animation in animation queue is updated if an action animation or physical behaviour will be inserted, to match it perfectly (end of animation, for a possible blending over to the basic animation). Therefor the basic animation is split and with using locomotion allows perfectly blending from basic animation into an action animation and vice versa.

In combination with the action animation or instead of it the physical behaviour animation can be used. Filling in missing or complex animation where physical behaviours play a role and there is no matching animation (e.g. collision of players) further described above with respect to the aspect of physical simulation.

Revise and optimize animations from the animation queue may be done based on positional data. Match orientation of head, eyes and exact positions of elbow, hand, fingers etc. Depending on what positions are delivered by the tracking system. As illustrated in FIG. 13 it can be used to optimize a player shooting a ball. Where the direction of the live scene's ball trajectory is different to the one recorded with motion-capture. With blending in inverse kinematic over the underlaid animation and just for the shooting foot the process of a player kicking the ball will be adjusted so it looks more natural according to the ball trajectory. Same applies to optimization of arms and hands for the goal keeper. Another example is the orientation of the character's head, in most cases in football the player watches towards the ball, so that the head can be orientated towards the ball.

Following, further possible applications for the method of 3D reconstruction are described.

Live animation may be performed. What makes the technology unique, among other things, is that it is possible (with the method of live reconstruction) to change the "live" situations and interact with these. The generated 3D animation is interactive for users—these can operate with the camera, insert analytical elements and change the virtual environment in other ways. FIG. 15 shows the concept of watching the football event on a television screen and at the same time interacting with the 3D reconstruction on a tablet which displays the live scene in sync. This is the so called "Second Screen Experience".

In a way this is basically close to a standard broadcast of a match but extends the way to watch scenes by using camera angles not possible in normal broadcast (place it behind players on the field). There can be automatic cameras and players can be selected by the consumers which the camera is focusing on. Extra information like current condition of a player and statistics can be displayed to make the live experience entertaining. Predicting actions of players or evaluating and visualizing probabilities. Other views are also possible, as the bird view as shown in FIG. 16.

Target customers are broadcasters, news/media agencies, web portals, club websites as well as the direct sport enthusiast accessible on target devices in interactive web I smartphone I tablet applications. Interactivity gives the user full freedom to watch the scene from every perspective, enabling analytical elements and in a next step the user could also have the option to generate his own view on the goal, render it as a video and share it with friends.

In a virtual studio environment the live reconstruction can be used to display small holographic players on a moderators table. Technically an augmented reality product—the tactic table allows experts to analyze the scene live during the game. This puts the expert or commenter in front, and his view onto the live scenery. It could be very interesting to research the opportunities to blend from full 3D to the augmented reality representation or vice versa. This would enhance the product in a way to not rely on the studio camera but also to blend over to full 3D and have the full range of camera angles.

A multiplatform-solution may be provided. FIG. 14 illustrates the concept of a centralized server system to generate reconstructions for different target devices. The method of the reconstruction is executed on the server and the results are made available for a playback software on the devices. Different asset libraries (animation database is different) are used to support different quality levels of hardware devices. So a high-end workstation can be used as well as a smartphone.

The system depicted in FIG. 14 is provided as centralized server system. By a tracking system 1400 3D positional data for the live scenes are provided. The detected data may be stored in a storage device 1401 which is connected to a central server device 1402. According to FIG. 14, the centralized server device 1402 is connected to a library device 1403, a server storage 1404, and another library device 1405 providing a small animation library (Low-Detail Models). The central server device 1402 may provide the virtual 3D reconstruction animation to different display devices 1406, 1407 which, according to the embodiment in FIG. 14, are provided by a high-end engine 1406 and a multi-platform engine 1407. The high-end engine 1406 may be a broadcast device for rap video or stream. The multi-platform engine 1407 may refer to mobile devices such as mobile phones or tablet computers using different operating systems.

What is claimed is:

1. A method for real-time virtual 3D reconstruction of a live event broadcast including a plurality of participants, the virtual 3D reconstruction utilizing an animation system including a processor, an input device, and an output device, the method comprising:
   determining a first live action by a participant and live actions by other participants of the plurality of participants in the live event broadcast by analyzing 3D positional tracking data for the plurality of participants in the live event broadcast;
   determining an action probability for future live actions that the participant may make after the first live action by comparing the first live action by the participant to the live actions by the other participants;
   generating an action probability tree of virtual actions corresponding to the future live actions that may be made by the participant after the first live action by the participant in the live event broadcast;
   selecting a first virtual action from the action probability tree with the highest probability corresponding to the next future live action;
   providing a 3D animation data set for the first virtual action, the 3D animation data set being amendable to include additional animation details;
   optimizing the 3D animation data set to include the additional animation details to the first virtual action to further correspond to the future live action predicted to be made by the participant in the live event broadcast, the additional animation details including reconstruction of characters corresponding to the live action, the characters including physical attributes of at least one of the participants; and
   providing the optimized 3D animation data set of the first virtual action to the output device to display the virtual 3D reconstruction of the live event broadcast.

2. The method of claim 1, wherein the physical attributes correspond to the behavior of human body parts.

3. The method of claim 1, further comprising:
   comparing the first virtual action with a second live action, the second live action being made by the participant and being after the first live action; and
   if the first virtual action does not match with the second live action,
      selecting a second virtual action from the action probability tree with the next highest probability; and
      providing a 3D animation data set for the second virtual action
   to the output device to display the virtual 3D reconstruction of the live event broadcast.

4. The method of claim 1, further comprising generating an animation data queue by repeating one or more of:
   the determining of the first live action by the participant; and
   the providing of the 3D animation data set.

5. The method of claim 4, further comprising performing an event correction for the animation data queue by at least one of:
   deleting one of the plurality of 3D animation data sets from the animation data queue; and
   modifying one of the plurality of 3D animation data sets from the animation data queue when a new circumstance occurs in the live event broadcast.

6. The method of claim 5, wherein the at least one of the deleting and the modifying of the one of the plurality of 3D animation data sets includes substituting a 3D animation data set selected from the animation data queue with a new 3D animation data set determined to closer animate the first virtual action.

7. The method of claim 5, wherein the event correction is based on the action probability for the future live actions, animations in the animation data queue, and the new circumstance in the live event broadcast,
   the performing the event correction occurring in a delayed time range, the delayed time range being between a live time and a playback time of the live event broadcast, the playback time being the current time of playback of the animation data queue.

8. The method of claim 4, wherein the generating of the animation data queue occurs in a delayed time range, the delayed time range being between a live time and a playback time of the live event broadcast, the playback time being the current time of playback of the animation data queue,
   further comprising determining a second live action made by the participant after the first live action during the delayed time range, the second live action having a higher influence on the action probability for future live actions than other action probabilities in the action probability tree.

9. The method of claim 1, wherein the 3D animation data set includes simulated 3D animation data and pre-recorded motion capture data.

10. The method of claim 1, wherein the action probability tree includes a basic animation of the highest probability action for the future live actions, the basic animation being a basic layer of a virtual action permitting an overlaid animation to be blended in and out of the basic animation.

11. The method of claim 10, further comprising modifying the 3D animation data set with an action animation to correct or amend the basic animation for the first virtual action, the action animation being selected to correspond to the basic animation and including further animation details of the first virtual action corresponding to the future live action predicted to be made by the participant in the live event broadcast.

12. The method of claim 1, wherein the providing the 3D animation data includes at least one of generating the 3D animation data and selecting from a database the 3D animation data.

13. An animation system for real-time virtual 3D reconstruction of a live event broadcast including a plurality of participants, the animation system comprising:
   an input device;
   an output device; and
   a processor configured to:
      determine a first live action by a participant and live actions by other participants of the plurality of participants in the live event broadcast by analyzing 3D positional tracking data for the plurality of participants in the live event broadcast;
      determine an action probability for future live actions that the participant may make after the first live action by comparing the first live action by the participant to the live actions by the other participants;
      generate an action probability tree of virtual actions corresponding to the future live actions that may be made by the participant after the first live action by the participant in the live event broadcast;
      select a first virtual action from the action probability tree with the highest probability corresponding to the next future live action;

provide a 3D animation data set for the first virtual action, the 3D animation data set being amendable to include additional animation details;

optimize the 3D animation data set to include the additional animation details to the first virtual action to further correspond to the future live action predicted to be made by the participant in the live event broadcast, the additional animation details including reconstruction of characters corresponding to the live action, the characters including physical attributes of at least one of the participants; and provide the optimized 3D animation data set of the first virtual action to the output device to display the virtual 3D reconstruction of the live event broadcast.

14. The animation system of claim 13, wherein the physical attributes correspond to the behavior of human body parts.

15. The animation system of claim 13, wherein the processor is further configured to:

compare the first virtual action with a second live action, the second live action being made by the participant and being after the first live action; and if the first virtual action does not match with the second live action, select a second virtual action from the action probability tree with the next highest probability;

provide a 3D animation data set for the second virtual action to the output device to display the virtual 3D reconstruction of the live event broadcast.

16. The animation system of claim 13, wherein the processor is further configured to generate an animation data queue by repeating one or more of:

the determination of the first live action by the participant; and the providing of the 3D animation data set.

17. The animation system of claim 16, wherein the processor is further configured to perform an event correction for the animation data queue by at least one of:

deleting one of the 3D animation data sets from the animation data queue; and modifying one of the 3D animation data sets from the animation data queue when a new circumstance occurs in the live event broadcast.

18. The animation system of claim 17, wherein the at least one of the deleting and the modifying of the one of the 3D animation data sets includes substituting a 3D animation data set selected from the animation data queue with a new 3D animation data set determined to closer animate the first virtual action.

19. The animation system of claim 16, wherein the generation of the animation data queue occurs in a delayed time range, the delayed time range being between a live time and a playback time of the live event broadcast, the playback time being the current time of playback of the animation data queue, wherein the processor is further configured to determine a second live action made by the participant after the first live action during the delayed time range, the second live action having a higher influence on the action probability for future live actions than other action probabilities in the action probability tree.

20. A non-transitory computer-readable media including a computer program for performing a process of running an animation system for real-time virtual 3D reconstruction of a live event broadcast, the animation system including a processor, an input device, and an output device, the process comprising:

determining a first live action by a participant and live actions by other participants of the plurality of participants in the live event broadcast by analyzing 3D positional tracking data for the plurality of participants in the live event broadcast;

determining an action probability for future live actions that the participant may make after the first live action by comparing the first live action by the participant to the live actions by the other participants;

generating an action probability tree of virtual actions corresponding to the future live actions that may be made by the participant after the first live action by the participant in the live event broadcast;

selecting a first virtual action from the action probability tree with the highest probability corresponding to the next future live action;

providing a 3D animation data set for the first virtual action, the 3D animation data set being amendable to include additional animation details;

optimizing the 3D animation data set to include the additional animation details to the first virtual action to further correspond to the future live action predicted to be made by the participant in the live event broadcast, the additional animation details including reconstruction of characters corresponding to the live action, the characters including physical attributes of at least one of the participants; and providing the optimized 3D animation data set of the first virtual action to the output device to display the virtual 3D reconstruction of the live event broadcast.

* * * * *